(12) United States Patent
Underhill

(10) Patent No.: US 10,595,464 B2
(45) Date of Patent: Mar. 24, 2020

(54) CONTINUOUS ROUND BALER

(71) Applicant: McHale Engineering, Ballinrobe, County Mayo (IE)

(72) Inventor: Kenneth R. Underhill, Strasburg, PA (US)

(73) Assignee: McHale Engineering (IE)

( * ) Notice: Subject to any disclaimer, the term of this patent is extended or adjusted under 35 U.S.C. 154(b) by 0 days.

(21) Appl. No.: 15/532,290

(22) PCT Filed: Nov. 6, 2015

(86) PCT No.: PCT/US2015/059522
§ 371 (c)(1),
(2) Date: Jun. 1, 2017

(87) PCT Pub. No.: WO2016/089546
PCT Pub. Date: Jun. 9, 2016

(65) Prior Publication Data
US 2017/0332556 A1 Nov. 23, 2017

Related U.S. Application Data

(60) Provisional application No. 62/111,884, filed on Feb. 4, 2015, provisional application No. 62/086,594, filed on Dec. 2, 2014.

(51) Int. Cl.
*A01F 15/07* (2006.01)
*A01F 15/08* (2006.01)
*A01F 15/10* (2006.01)

(52) U.S. Cl.
CPC ........ *A01F 15/0705* (2013.01); *A01F 15/071* (2013.01); *A01F 15/0883* (2013.01); *A01F 15/106* (2013.01); *A01F 2015/0735* (2013.01)

(58) Field of Classification Search
CPC .... A01D 37/00; A01D 39/005; A01D 43/006; A01F 15/0705; A01F 15/00; A01F 15/07;
(Continued)

(56) References Cited

U.S. PATENT DOCUMENTS 3,323,445 A 6/1967 Bushmeyer
4,285,190 A * 8/1981 Ermachkov ............ A01F 15/07
100/15

(Continued)

FOREIGN PATENT DOCUMENTS

DE 1802314 A1 1/1971
EP 0268002 5/1988
(Continued)

OTHER PUBLICATIONS

Supplemental European Search Report dated Aug. 24, 2018.

*Primary Examiner* — Robert E Pezzuto
(74) *Attorney, Agent, or Firm* — Miller Law Group, PLLC

(57) ABSTRACT

A continuous round baler forms a cylindrically-shaped bale by spiral, coiled layers created by a conical portion of a bale-forming chamber and protruded upwardly from a cylindrical portion of the bale-forming chamber. The bale is circumferentially supported by netting applied to the bale in the cylindrical portion. A rotary feed table receives crop from the field and feeds the crop into the conical portion. The bale forming process can be interrupted if an insufficient volume of crop is collected on the rotary feed table. The netting material is provided on short rolls to facilitate loading onto the machine. A cutoff mechanism is coupled to the growth of the bale from the cylindrical portion to sever the bale at a predetermined length with end surfaces that are (Continued)

perpendicular to the axis of the bale. A bale density mechanism supports the distal end of the bale as the bale protrudes upwardly.

24 Claims, 30 Drawing Sheets

(58) Field of Classification Search
CPC ................ A01F 15/071; A01F 15/0715; A01F 15/0883; B30B 11/222
USPC ................ 56/341, 343; 100/76, 88, 97, 148
See application file for complete search history.

(56) References Cited

U.S. PATENT DOCUMENTS

| | | | |
|---|---|---|---|
| 4,464,889 A | 8/1984 | Weelink | |
| 4,534,285 A | 8/1985 | Underhill | |
| 4,597,254 A | 7/1986 | Bowden | |
| 5,020,311 A * | 6/1991 | Matthies | B30B 9/3082 100/95 |
| 7,156,015 B2 * | 1/2007 | McHale | A01F 15/071 100/177 |
| 8,291,687 B2 | 10/2012 | Herron | |
| 8,413,414 B2 | 4/2013 | Herron | |
| 8,464,509 B2 | 6/2013 | Herron | |
| 8,544,243 B2 | 10/2013 | Herron | |
| 8,707,865 B2 | 4/2014 | Oakes | |
| 8,733,241 B2 * | 5/2014 | Roberge | A01F 15/0705 100/88 |
| 8,910,460 B2 * | 12/2014 | Horstmann | A01F 15/0705 100/88 |
| 9,198,360 B2 * | 12/2015 | Reijersen Van Buuren | A01F 15/071 |

FOREIGN PATENT DOCUMENTS

| | | |
|---|---|---|
| EP | 0268002 A2 | 5/1988 |
| EP | 0268003 | 5/1988 |
| EP | 0270726 | 6/1988 |
| EP | 2556741 | 2/2013 |
| GB | 2197247 A1 | 5/1988 |
| GB | 2254824 A | 10/1992 |
| JP | S53-147239 | 4/1952 |
| JP | H02-200117 | 8/1990 |

* cited by examiner

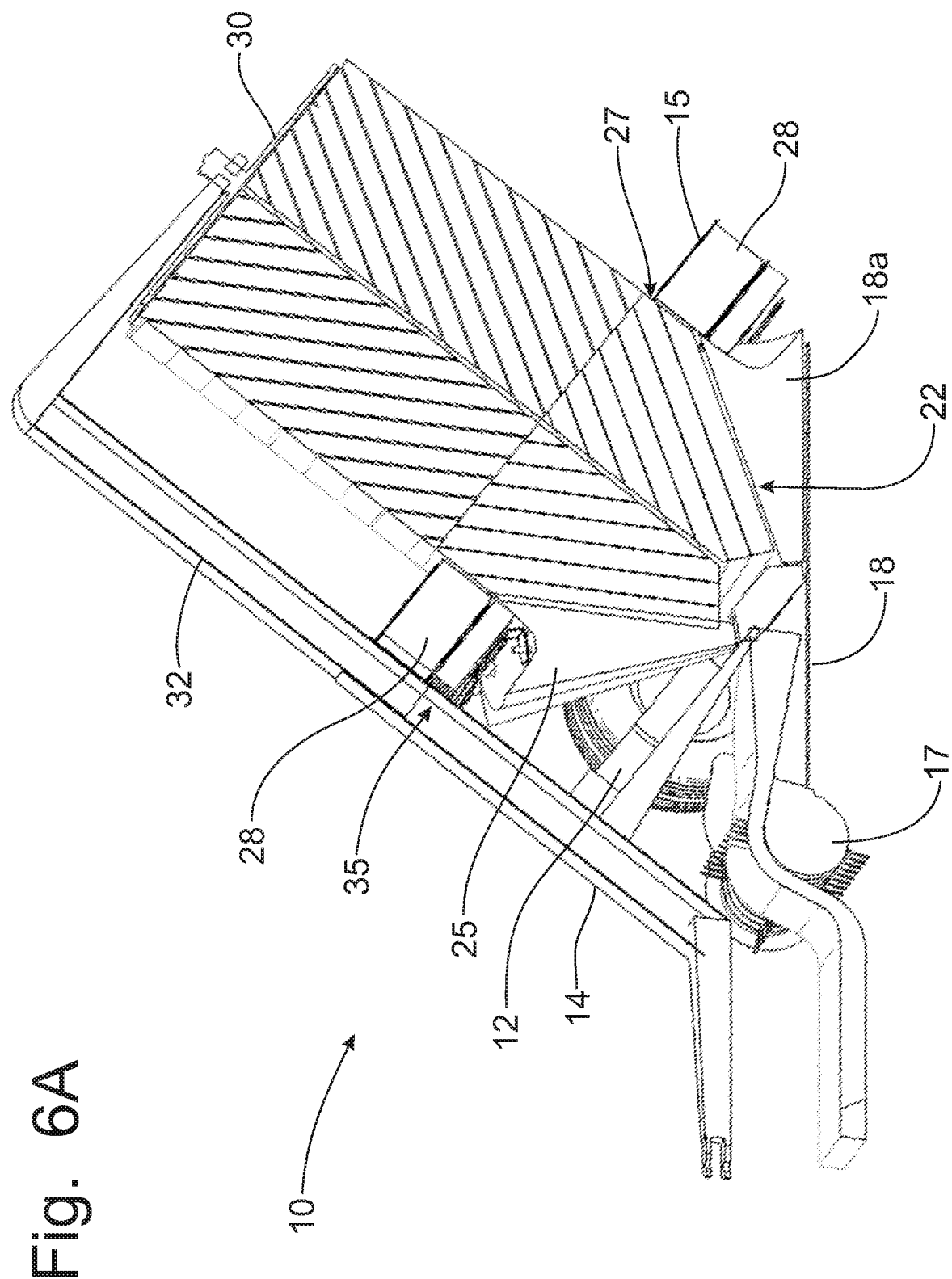

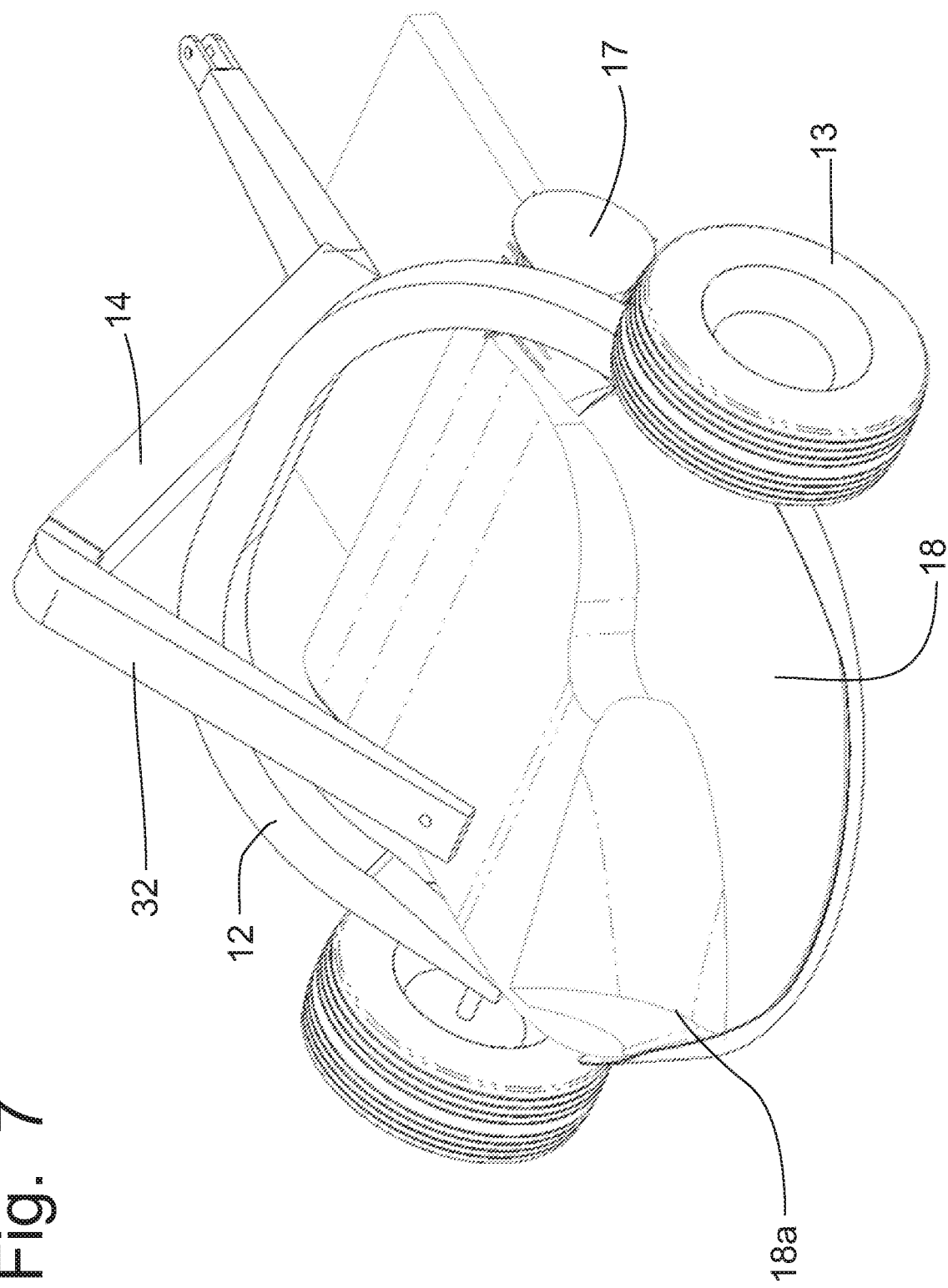

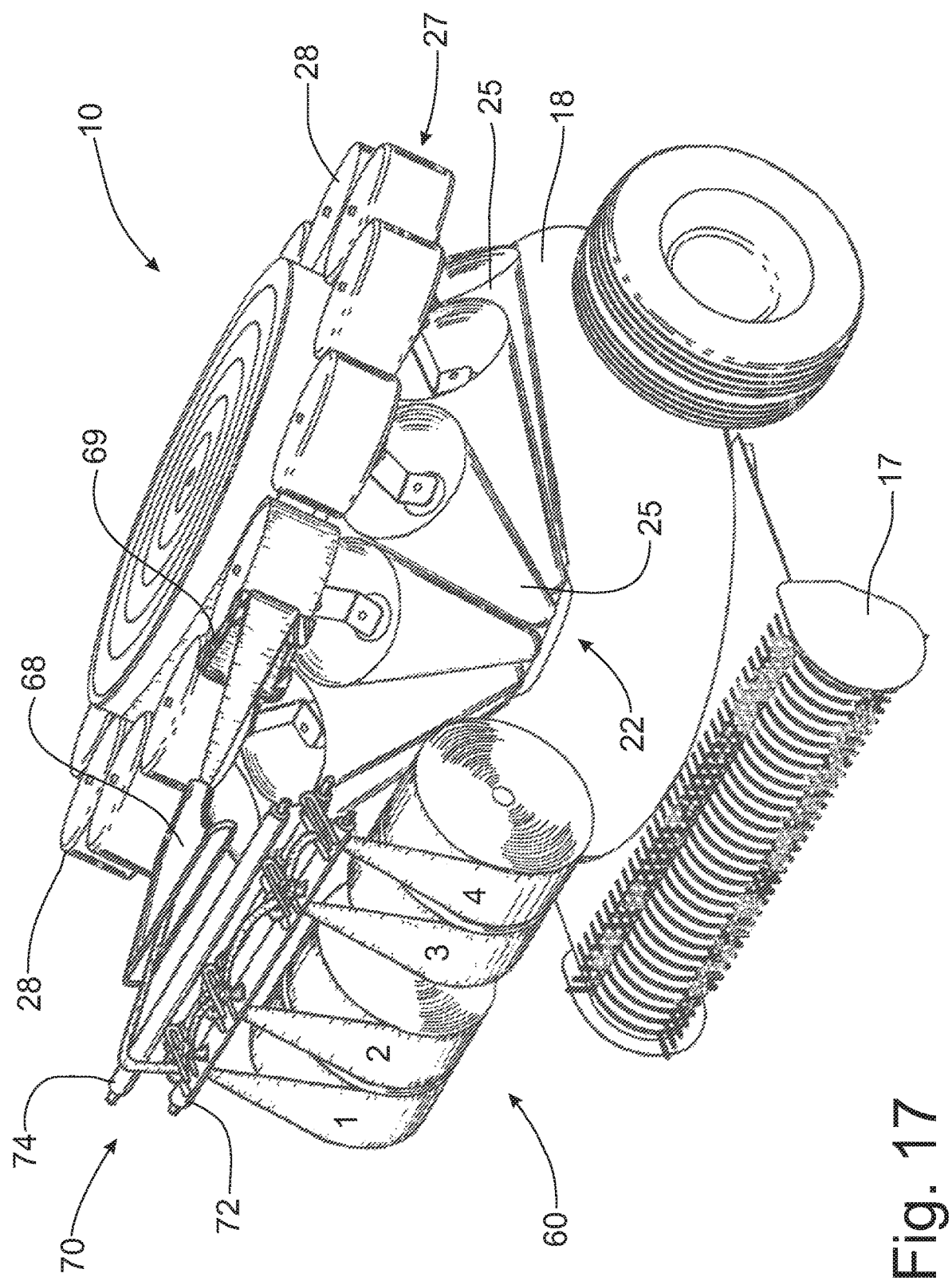

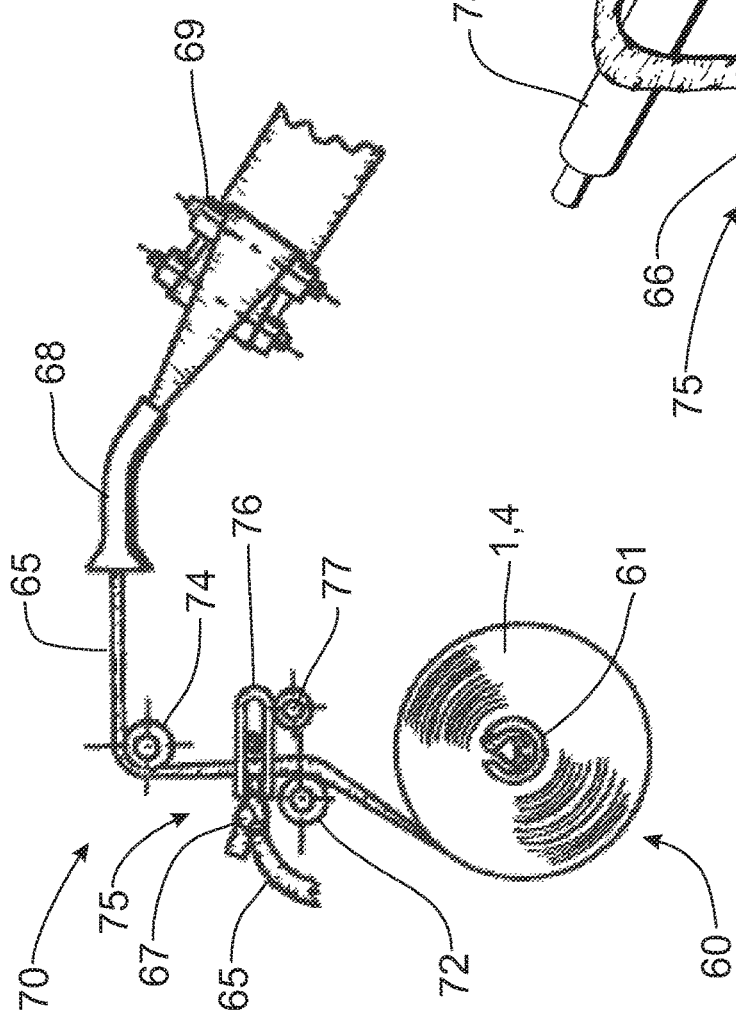

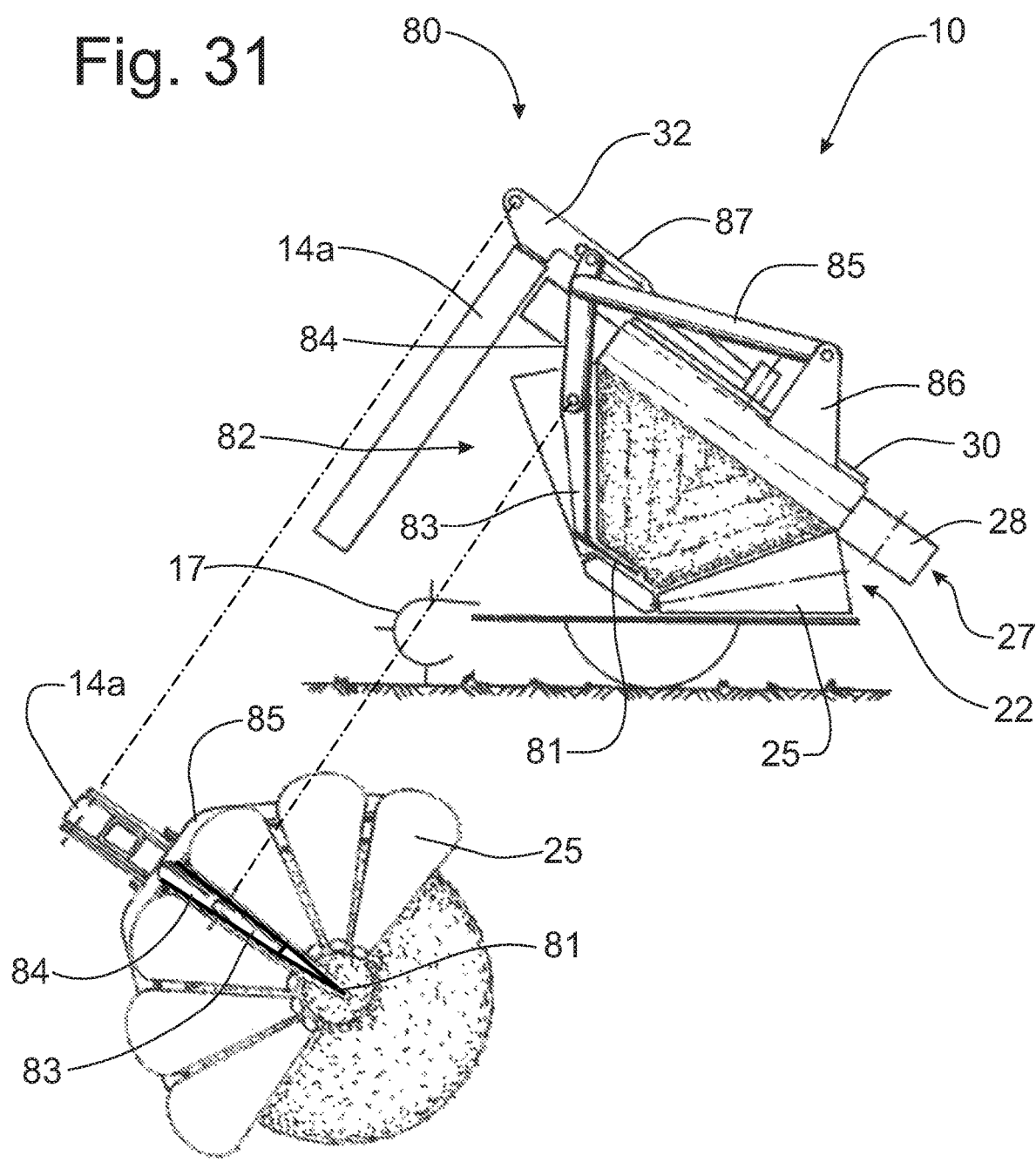

CONTINUOUS ROUND BALER

CROSS-REFERENCE TO RELATED APPLICATIONS

This application claims domestic priority on U.S. Provisional Patent Application Ser. No. 62/086,594, filed on Dec. 2, 2014, and on U.S. Provisional Patent Application Ser. No. 62/111,884, filed on Feb. 4, 2015, the contents of which are incorporated herein by reference.

FIELD OF THE INVENTION

This invention relates generally to the formation of cylindrical bales of crop material in the field and, more particularly, to a round baler that is operable to move across a field to continuously collect crop material for the formation of a round baler without stopping to eject the round bale from the machine.

BACKGROUND OF THE INVENTION

The baling of agricultural crop material has traditionally been done with rectangular balers that formed compressed bales of crop material, such as forage crop material, that could be handled manually. As farming operations became more mechanized, the sizes of the bales of crop material increased with some balers forming large rectangular bales and other balers forming cylindrically shaped bales, commonly referred to as round bales. The rectangular balers, whether the balers formed a small bale that can be manually handled, or a large bale that requires machinery to handle the bales, had an advantage of being able to continuously gather the crop material from the fields for compressing into the bales.

The rectangular balers collected loose crop material from the field and fed the collected crop material into a baling chamber for compression against the previously formed bales and against the compression structure of the baler. Once the rectangular bale of crop material was formed, the formed bale remained in the bale case to serve as a back stop for the next bale being formed until the formed rectangular bale reached the end of the bale case where the formed bale was dropped back onto the field, although in some configurations of large rectangular balers the formed bale was collected by a trailing apparatus connected to the baler.

Conventional round balers also collect crop material from the field and using an apparatus that can be continuous belts, either a single wide belt or multiple smaller belts, a chain mechanism, or rollers, to form an expandable webbed bale chamber for the formation of a cylindrical bale of crop material within the machine where the serpentine formation of the belt or chain mechanism allow the bale chamber to expand as the bale grows through the addition of crop material into the machine. Other configurations of round balers define a fixed diameter bale chamber, typically utilizing a plurality of rolls mounted circumferentially to define the fixed chamber, and cause the crop material fed therein to roll into a compressed cylindrical bale.

However, all of these conventional round balers eventually had to cease temporarily the operation of collecting crop material so that the fully formed bale could be ejected from the machine. Ejection of the bale typically required the machine to stop forward progress, open a tailgate structure and then force the formed cylindrical bale out of the machine onto the surface of the field to be retrieved later, followed by the closing of the tailgate structure to be able to start the process of making a new round bale. Thus, the conventional round balers did not have the advantage of the rectangular balers in being able to continuously move over the surface of the field to collect crop material therefrom.

Wrapping the formed bales is also a distinction between rectangular and cylindrical bales of crop material. Rectangular bales typically utilize heavy needle mechanisms and associated knotters to position twine or wire around the longitudinal periphery of the formed bale, which becomes tied into a knot or twisted wire to secure the wrapping around the bale. Round balers are typically wrapped in netting material, or with plastic sheeting, to secure the cylindrical periphery of the formed bales. Conventional round balers are provided with net wrapping devices that feed a supply of netting material retained on a roll of the netting material within the device into the bale chamber to be fed around the circumference of the cylindrical bale. Typically, the netting material is wrapped multiple times so that the netting material is retained on the bale after being discharged from the round baler.

Such conventional round balers all have several common problems:

1. There is an operational time loss to wrap and eject the bale from the baler.
2. Expensive and complicated mechanisms are required to form and then quickly eject the formed bale. Some round baler manufacturers have spent considerable effort to obtain a 3-5 second reduction in time for ejecting the bale from the round baler.
3. For balers that utilize belts, belt tracking and durability are problems, particularly for the more complicated continuous round balers. With multiple belts, and especially with long multiple belts, problems are encountered with manufacturing consistency and with utilization of the belts in different crop conditions. Belts that travel over rollers have an inherent problem of crop wrapping around the rollers and forcing the belts out of engagement with the rollers.
4. Maintaining a uniform cylindrical bale shape requires the operator to weave the round baler back and forth laterally over the crop windrow so that an even amount of hay will be maintained at both ends of the round bale.
5. Net wrapping systems are complicated and use heavy rolls of netting material that have to be lifted and loaded into an elevated receptacle on the baler.
6. Crop loss, particularly those very valuable leaves and other fines, leak from the baler during operation and are lost from the baling process and fall to the ground.

Accordingly, a major objective of most manufacturers of conventional round balers is to provide a round baler that is continuously operable to collect crop material from the surface of the field without requiring a stop to eject or discharge the formed bale from the round baler, thus capturing the advantage of operating a rectangular baler. Such a machine has been referred to as a continuous round baler. Conventional round balers have three major cycles, formation of the cylindrical bale, wrapping the formed bale, and ejecting the wrapped bale from the machine. Conventional thought is to add a fourth cycle to the process, the accumulation of the crop material being collected from the field while the machine is going through the wrapping and ejection cycles.

Most of the attempts to create a continuous round baler have centered on the provision of a two chamber round baler such that one chamber can be used to start a new round bale while the other chamber ejects the round bale from the machine. One such attempt was patented by Kenneth R.

Underhill in U.S. Pat. No. 4,534,285, issuing on Aug. 13, 1985. The chain and slat serpentine mechanism interrupted the flow of hay into the rear bale chamber to start a new bale in a front chamber while the formed bale was being discharged. Once the main bale chamber was emptied, the partially completed bale would be transferred to the rear chamber and completed. This two chamber concept theoretically solved the first problem noted above to end the operational time loss, but worsened the second problem noted above, as this was a very big, heavy, complicated and expensive machine.

A similar approach was patented by Don Bowden in U.S. Pat. No. 4,597,254, issuing on Jul. 1, 1986, and used a disk to rotate an indexing roller from behind the formed bale to a position in front of the formed bale, temporarily creating a new bale forming chamber while the formed bale was being ejected from the machine. This Bowden machine encountered problems of the newly formed bale in the front chamber growing too fast while the formed bale was being ejected, which was particularly true in heavy crop conditions.

Examples of this conventional thinking can be found in U.S. Pat. No. 8,707,865, granted on Apr. 29, 2014, to Scott Oakes in which a surge bin is supported on the frame of the round baler in front of the primary crop pick-up mechanism which collects and feeds crop material into the bale chamber. This surge bin includes a supplemental crop pick-up mechanism that collects crop material into the surge bin where the material accumulates while the baler discharges the previously formed bale. The surge bin then meters the accumulated crop material into the primary crop pick-up mechanism to be transferred into the bale for the bale formation cycle. Although the surge bin does not start the formation of a round bale, as noted for the Underhill and Bowden machines, the surge bin is still part of the two chamber concept allowing incoming hay to be collected in a front chamber while the bale is being ejected from the rear chamber.

A substantially more complex accumulation apparatus is disclosed in U.S. Pat. No. 8,733,241, granted to Martin Roberge on May 27, 2014, in which the round baler is provided with first and second bale chambers with associated first and second belt or chain serpentine mechanisms. The first bale chamber is operated to start the formation of a round bale while the second bale chamber wraps and discharges the completed round bale. Then the first chamber transfers the partially finished bale into the second chamber to complete the bale formation cycle. Once completed, the first chamber interrupts the flow of crop material to the second bale chamber to accumulate the crop material by starting a new round bale. This Roberge machine appears to be very heavy and very complex.

A different form of an accumulation chamber is disclosed in U.S. Pat. No. 8,291,687, issued on Oct. 23, 2012, and also in U.S. Pat. No. 8,413,414, issued on Apr. 9, 2013; in U.S. Pat. No. 8,464,509, issued on Jun. 18, 2013; and in U.S. Pat. No. 8,544,243, issued on Oct. 1, 2013, to Maynard Herron, et al. The Herron configuration provides an elongated accumulation chamber in which the conventional crop pick-up mechanism is located at a forward end of the accumulation chamber. The incoming hay is simply collected in the elongated accumulation chamber while the previously formed bale is wrapped and discharged from the baler. The problem with this design is that the accumulation chamber has to be very large, especially if accumulating loose crop and operating in heavy crop windrows. Also, the forward ground speed of the round baler has to be slowed enough to be able to feed the accumulated hay from the accumulation chamber along with the hay from a heavy windrow, so that this large amount of crop being inserted into the bale chamber does not plug the machine. Slowing the machine defeats the original reason for having the accumulation chamber which is to speed up the production.

European Patent No. 2556741, published on Feb. 13, 2013, reflects a continuous round baler concept developed by Krone. This Krone machine also incorporates the accumulation chamber concept and the accumulation of loose hay is a difficult thing to properly manipulate. This Krone machine is very large and very complex. The accumulation chamber is disposed at the front to collect loose hay while the bale is being ejected to a rear wrapping platform. Once the tail gate has closed, the accumulated hay it pushed into the bale chamber while the bale on the rear platform is wrapped in plastic and dropped onto the ground.

European Patent Publication No. 0268002, published on May 25, 1988; European Patent Publication No. 0268003, published May 25, 1988; and European Patent Publication No. 0270726, published on Jun. 15, 1988, disclose a concept developed by Deere & Company whereby a conical bale forming chamber formed from tapered rollers receives hay from the field via a conventional pick-up mechanism to create a spirally formed, cylindrically shaped bale. The frusto-conical bale forming chamber is oriented such that the lower angled side thereof is parallel to the ground to facilitate the feed of crop into the conical chamber. Crop moves from the conical bale forming chamber into a cylindrical fixed diameter chamber formed by rollers in alignment with the large ends of the tapered rollers in the conical bale forming chamber. The cylindrical portion extends upwardly at a 10 to 30 degree angle to the ground to provide an elevated end so that the discharge can be made directly onto a wagon or transporter. A density control mechanism is disclosed along with the discharge of the formed cylindrical bale radially from the cylindrical chamber.

In European Publication 0268003, a bale cut-off mechanism is disclosed as being located near the conical bale chamber, although the specification does not disclose how the cylindrical rollers are to be supported next to the opening for insertion of the cutting mechanism. In European Publication 0268002, a bale cut-off mechanism is disclosed at the downstream end of the cylindrical bale chamber, although the specification does not disclose how the formed round bale is to be supported before and while being cut.

All of these crop material accumulation devices accomplish the same goal, i.e. to allow the baler to continue to move forwardly and collect crop material while the non-bale formation cycles are completed and the bale chamber is ready to re-start the formation of a round bale. While technically the baler does not stop moving in a forward direction, these two chamber concepts are not a truly continuous bale formation process. Furthermore, each of these configurations suffer from the same disadvantages in that the tailgate of the baler must be opened, raising the center of gravity of the machine and adding stress on the structural components, while the baler is being moved along the surface of the field.

One skilled in the art will recognize that the surface of an agricultural field is not a smooth, level surface, but instead contains crop mounds, tilling and cultivating furrows and other undulations that cause the machines traveling thereon to bounce and shake significantly. Raising the tailgate of a round baler to discharge a completely formed round bale, which can weigh more than one thousand pounds, while the round baler is moving across the undulating surface of an agricultural field, magnifies the stress that has to be carried by the frame and other structural components of the round baler. Thus, not only is durability brought into question, but stability and safety are also significant factors.

Furthermore, the operation of a round baler utilizing an accumulation chamber to store collected crop material while the round baler performs the non-bale forming functions of the conventional round baler does not create a truly continuously operable round baler in the same sense as a rectangular baler is continuously operable. Accordingly, it would be desirable to provide a continuously operable round baler that is operable to form a cylindrical bale of crop material while being moved across a field. It would be further desirable to provide a net wrapping apparatus that is adaptable to the continuously operable round baler to provide a wrapping of netting material while the cylindrical bale of crop material is being formed.

SUMMARY OF THE INVENTION

It is an object of this invention to overcome the disadvantages of the prior art by providing a continuous round baler having a continuous bale forming operation.

It is another object of this invention to provide a continuous round baler that does not require a second chamber to partially form a round bale or to accumulate crop while the baler is ejecting a formed bale from the baler.

It is still another object of this invention to provide a continuous round baler that forms a cylindrically shaped bale in a spiral, coiled manner.

It is a feature of this invention that the bale forming chamber includes a conical portion that receives crop material and starts the crop to move internally into a spiral pattern.

It is another feature of this invention that the bale forming chamber includes a cylindrical portion mating with the large end of the conical portion to receive the spirally formed crop material from the conical portion.

It is an advantage of this invention that the diameter of the formed bale is defined by the large end of the conical portion and the mating cylindrical portion of the bale forming chamber.

It is another feature of this invention that the cylindrical portion of the bale forming chamber can be utilized to apply a net wrap to the circumference of the cylindrically formed bale.

It is another advantage of this invention that the net wrapping operation can be accomplished continuously while the cylindrical bale is being formed.

It is still another feature of this invention that the crop can be fed into the conical portion of the bale forming chamber by a rotary feed table that delivers the crop material collected from the field to a fixed point on the side of the conical portion.

It is still another advantage of this invention that a conventional crop pick-up mechanism can be utilized to elevate crop material from the ground and onto the rotary feed table.

It is still another object of this invention to provide a continuous round bale forming operation that will interrupt the flow of crop material into the conical portion of the bale forming chamber when light crop conditions are encountered with crop material being continuously picked up from the ground and accumulated on the rotary feed table.

It is yet another feature of this invention that the rotary feed table has a control mechanism that operates the drive mechanism for the bale forming chamber.

It is yet another advantage of this invention that the crop material is only fed into the bale forming chamber when a satisfactory volume of crop can be placed into the conical portion of the bale forming chamber.

It is still another advantage of this invention that the placement of netting material on the circumference of the formed bale is only accomplished when the bale forming chamber is being operated and a sufficient volume of crop material is being received to properly progress the movement of the formed bale in the cylindrical portion of the bale forming chamber.

It is a further feature of this invention that the bale forming chamber is oriented at an angle greater than 20 degrees relative to the ground.

It is a further advantage of this invention that the weight of the formed bale assists in increasing the density of the cylindrical bale being formed in the conical portion of the bale forming chamber.

It is yet a further feature of this invention that that cylindrical portion of bale forming chamber has a length dimension that is substantially shorter than a corresponding length dimension of the conical portion of the bale forming chamber.

It is yet a further advantage of this invention that the cylindrical bale is contained circumferentially by the net wrapping material applied while the cylindrically formed bale was within the cylindrical portion of the bale forming chamber.

It is a further object of this invention that the spirally formed cylindrical bale projects upwardly from the cylindrical portion of the bale forming chamber as the cylindrical bale is being formed within the conical portion of the bale forming chamber.

It is yet a further object of this invention to provide a cutoff mechanism that severs the projected cylindrical bale at a predetermined length dimension.

It is another feature of this invention that the continuous round baler includes a density control mechanism that engages the distal end of the cylindrical bale projecting upwardly from the cylindrical portion of the bale forming chamber.

It is still another feature of this invention that the density control mechanism includes a support plate engaged with the distal end of the cylindrical bale.

It is another advantage of this invention that the density control mechanism is operable to advance with the growth of the cylindrical bale projecting from the cylindrical portion of the bale forming chamber.

It is yet another feature of this invention that the cutoff mechanism supported to progress with the growth of the cylindrical bale after the cutoff mechanism is initiated to sever a predetermined length of cylindrical bale from the continuous round baler.

It is yet another advantage of this invention that the cutoff mechanism will provide end surfaces of the cylindrical bale that is perpendicular to the axis of the cylindrical bale.

It is still another feature of this invention that the cutoff mechanism could be programmed to provide a predetermined length of the severed cylindrical bale being cut that is desired by the operator, and to change the length of the bale to a different value as desired.

It is still another advantage of this invention that the generally vertical orientation of the bale forming chamber will cause the crop losses from forming the cylindrical bale to fall back onto the rotary feed table to be re-incorporated into the formation of the cylindrical bale.

It is a further advantage of this invention that the crop losses are minimized.

It is still another advantage of this invention that the rolls of netting material to be placed onto the machine will be smaller than are currently being used by conventional round balers, thus making the installation of netting material onto the round baler an easier task that previously known.

It is yet a further feature of this invention that the continuous round baler is smaller and, thus, lighter than currently known conventional non-continuous round balers.

It is a further advantage of this invention that the continuous round baler has no belts, no serpentine mechanism and less moving parts than a conventional round baler, and therefore has no belt tracking issues, no belt or chain life issues and no need for an expensive mechanical quick bale eject mechanism.

It is yet a further advantage of this invention that the operator does not have to weave the baler laterally to maintain bale shape.

It is an aspect of this invention to provide a continuous round baler formed with a bale forming chamber having a conical portion that terminates in a cylindrical portion having a net wrapping mechanism associated therewith so that a cylindrical bale protrudes from the cylindrical portion having netting wrapped around the exterior and a support plate engaged with the distal end of the bale. A bale severance mechanism cuts the protruding bale at a desired length for discharge from the baler as the subsequent bale is being formed. It is another aspect of this invention to provide a continuous round baler with only a single bale chamber that is continuously operable to produce a cylindrical bale. In is another aspect of this invention that the net wrapping mechanism can utilize narrow width netting material that is applied continuously to the protruding bale while in engagement with the cylindrical portion of the bale forming chamber and being rotated. It is another aspect of this invention that the netting material can be provided in narrow width rolls that are interlocked together for application to the formed bale. It is another aspect of this invention that the net wrapping mechanism includes an interlock mechanism that operates to provide a continuous feed of netting material from one small width roll to the other.

It is another aspect of this invention that the round baler having a drive mechanism that can be interrupted to permit an accumulation of crop while being continuously retrieved from the field to prevent a waste of netting material. It is another aspect of this invention to provide a method of continuously forming a cylindrical bale without requiring accumulation of crop material during discharge of the full bale. It is another aspect of this invention to provide a bale severance mechanism that is operable to separate a formed cylindrical bale for discharge from the baler while bale formation continues within the baler. It is another aspect of this invention that the crop material is continuously picked up from the ground and deposited onto a rotatable feed plate that delivers the collected crop material to the conical bale chamber. It is another aspect of this invention that the bale severance mechanism is operable while the bale is being formed. It is another aspect of this invention to provide a continuous round baler having contiguous conical and cylindrical portions of a bale forming chamber that is oriented at an acute angle to vertical, and is oriented such that the major axis of the baler is parallel to the direction of travel. It is another aspect of this invention to provide a variable bale density system. It is another aspect of this invention to provide a continuous round baler that can produce variable length round bales.

It is a further object of this invention to provide a continuous round baler which is durable in construction, inexpensive of manufacture, carefree of maintenance, facile in assemblage, and simple and effective in use.

These and other objects, features and advantages are accomplished according to the instant invention by providing a continuous round baler that forms a cylindrically-shaped bale by spiral, coiled layers created by a conical portion of a bale-forming chamber and protruded upwardly from a cylindrical portion of the bale-forming chamber. The bale is circumferentially supported by netting applied to the bale in the cylindrical portion. A rotary feed table receives crop from the field and feeds the crop into the conical portion. The bale forming process can be interrupted if an insufficient volume of crop is collected on the rotary feed table. The netting material is provided on short rolls to facilitate loading onto the machine. A cutoff mechanism is coupled to the growth of the bale from the cylindrical portion to sever the bale at a predetermined length with end surfaces that are perpendicular to the axis of the bale. A bale density mechanism supports the distal end of the bale as the bale protrudes.

BRIEF DESCRIPTION OF THE DRAWINGS

The advantages of this invention will become apparent upon consideration of the following detailed disclosure of the invention, especially when taken in conjunction with the accompanying drawings wherein:

FIG. 6A is a schematic cross-sectional view taken along the vertical longitudinal centerline of the machine, showing a cylindrical bale protruding out of the cylindrical portion of the bale chamber while a new bale is being formed in the conical bale chamber;

FIG. 7 is an upper right, rear perspective view of the continuous round baler with components broken away to view the transfer table and the movement of the crop material shown in broken lines;

FIG. 17 is a schematic perspective view of the continuous round baler with an alternative net wrapping apparatus utilizing small width rolls of netting material as the netting supply source;

FIG. 18 is a partial side elevational view of the alternative net wrapping apparatus;

FIG. 19 is an enlarged partial perspective view of the interlocking mechanism tying the respective netting rolls together;

FIG. 31 is a partial schematic side elevational view of the continuous round baler having an alternative bale slicing mechanism, some of the conical rolls of the bale forming chamber being removed for purposes of clarity, the bale slicing mechanism being located at an initial position at the bottom of the conical bale formation chamber;

FIG. 32 is a bottom plan view of the continuous round baler shown in FIG. 31, dashed lines indicating the corresponding location of pivots with respect to FIGS. 31 and 32;

DETAILED DESCRIPTION OF THE PREFERRED EMBODIMENTS

Figure 1:
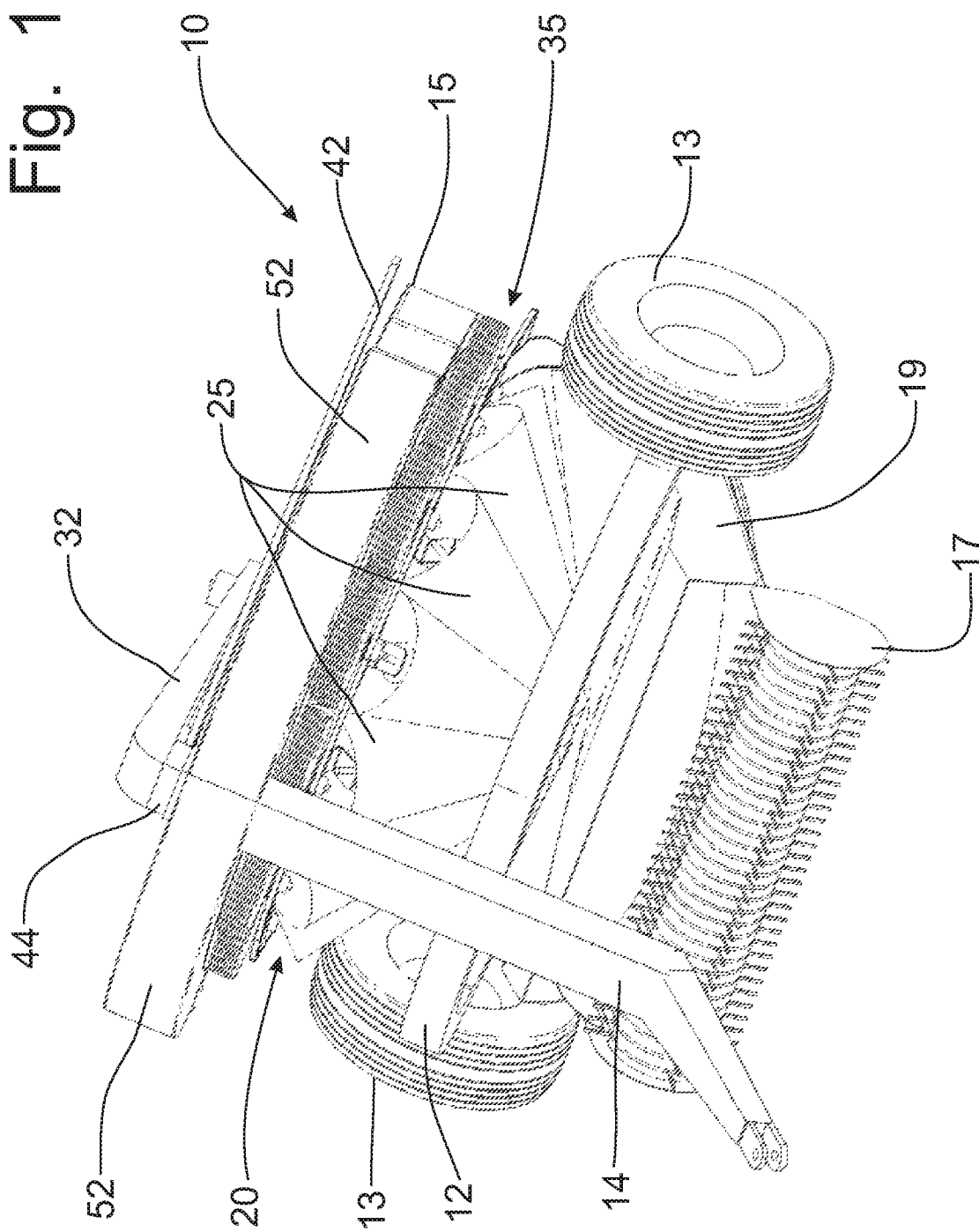
FIG. 1 is left front perspective view of the continuous round baler in the initial configuration.

Referring now to drawings, a continuous round baler incorporating the principles of the instant invention can best be seen. Any references to left, right, front and rear are determined by standing at the rear of the machine facing a prime mover, such as a tractor, that is connected to pull the continuous round baler in a forward direction behind the prime mover. The continuous round baler 10 includes a wheeled frame 12 having a pair of laterally spaced ground engaging wheels 13 and a forwardly extending draft tongue 14 that is connectable to a prime mover (not shown), such as a tractor, that provides a source of rotational power and a source of hydraulic power in a conventional manner.

The frame 12 further includes a circular roller support member 15 to rotatably support the rollers 28 in the bale chamber 20 as will be described in greater detail below. The draft tongue 14 connects to the roller support member 15 and provides a hollow receiver for the support beam 32 supporting the rear support plate 30 as will also be described in greater detail below. The frame 12 supports a conventional crop pick-up mechanism 17 extending transversely to create the operative forward edge of the machine 10 underneath the draft tongue 14. The purpose of the crop pick-up mechanism 17 is to elevate severed crop material lying on the surface of the ground and feed the crop material rearwardly into the machine 10.

Figure 7A:
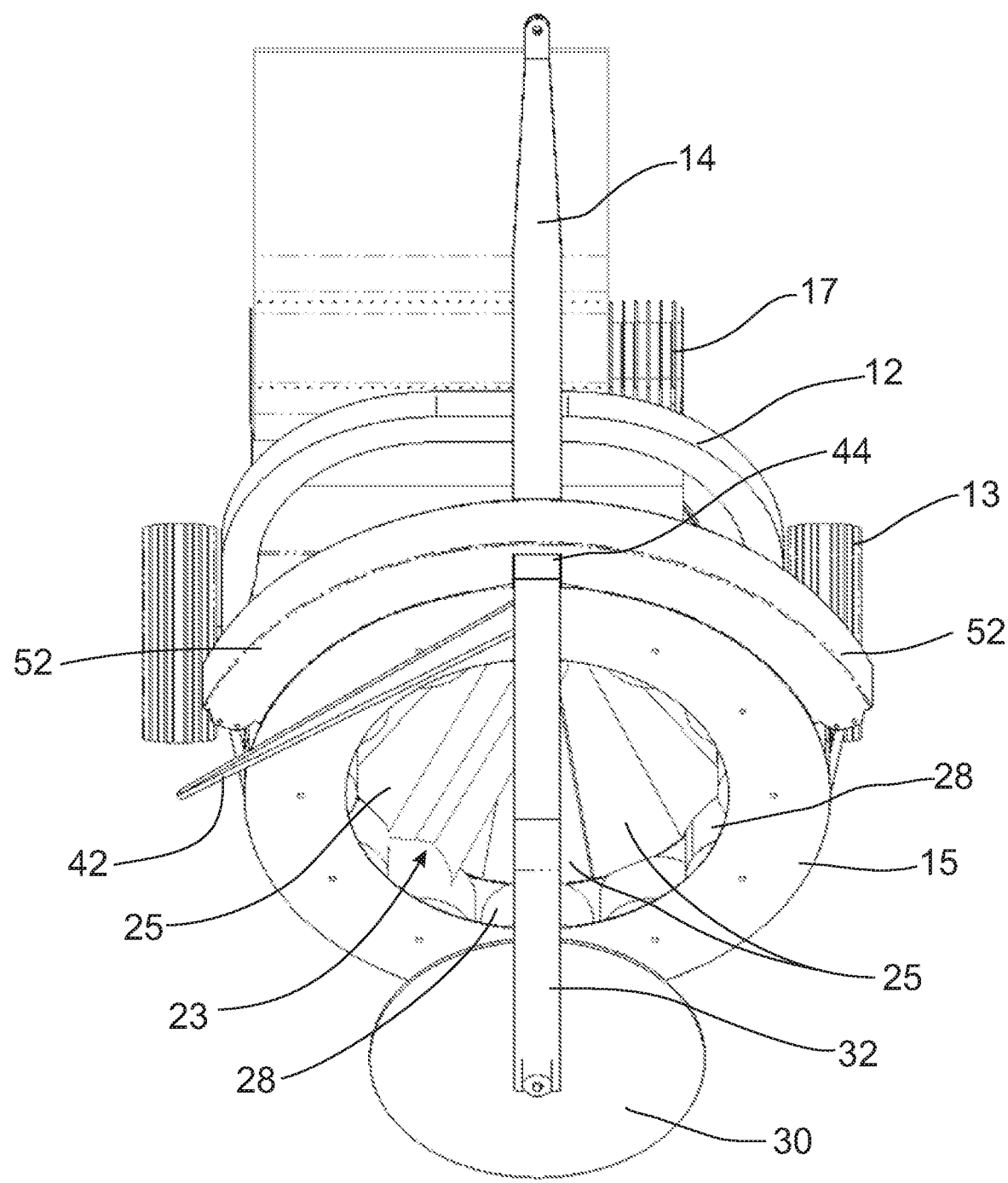
FIG. 7A is an upper rear perspective view of the continuous round baler with the rear support plate moved rearwardly to display the interior of the bale chamber, the opening in the conical portion of the bale chamber being depicted.

Receiving the crop material from the crop pick-up mechanism 17 is a transfer table 18 which has the function of transferring the crop material received from the pick-up mechanism 17 to one side of the transfer table 18. Although the transfer table 18 could have a rotary mechanism (not shown) associated with the transfer table 18 to convey the crop material received from the pick-up mechanism 17, the transfer table 18 could also be simply rotatably driven to move crop material to one side of the table 18 so that the crop material can be fed into the bale chamber 20 as depicted in FIG. 7 and will be described in greater detail below. The transfer table 18 can be operated to move crop in either direction, depending on the rotation of the rollers 25, 28 within the bale chamber, but preferably, the transfer table 18 will be operable to convey the crop material to the left side of the table 18 and upwardly into the bale chamber 20 through an infeed opening 23 between two selected conical rollers 25 as depicted in FIG. 7A. The transfer table 18 includes a curved barrier 19 that serves as a fence to retain the crop material on the transfer table 18 as the crop material is being moved to the side of the table 18 and fed into the bale chamber 20 upwardly along the ramp 18a and into the infeed opening 23.

The bale chamber 20 starts with a conical portion 22 adjacent to the transfer table 18. The conical portion 22 of the bale chamber 20 is formed by tapered, conical rollers 25 that are mounted for rotation by the frame 12 at a forward end thereof and by the circular roller support member 15 at the rearward end thereof. The tapered rollers 25 are arranged to converge at the forward frame 12 and to be spaced in a circular array at the diameter of the circular roller support member 15. Thus, the conical portion 22 of the bale chamber 20 is oriented generally vertically. As is best seen in FIGS. 1, 2, 5 and 6, the circular roller support member 15 is tipped from horizontal at an acute angle, preferably in the range of 20 to 60 degrees, which in turn orients the conical portion 22 and the cylindrical portion 27 of the bale chamber 20 at about 20-60 degrees from vertical, preferably between 25 to 35 degrees.

The circular roller support member 15 rotatably supports the cylindrical rollers 28 in a circular array with a central discharge opening 29 that is oriented generally vertically, as defined above. One skilled in the art will recognize that a truly vertical orientation of the discharge opening 29, as well as the bale chamber 20 could be utilized except that the deflection from being truly vertical by the acute angle facilitates the discharge of a severed round bale, as will be described in greater detail below.

The bale chamber 20 also includes a circular portion 27 formed by the short cylindrical rollers 28 that are rotatably housed within the circular roller support member 15. The conical rollers 25 and the cylindrical rollers 28 have a one to one relationship and are preferably driven together, such as via a drive belt or chain 36 shown in FIGS. 6 and 14. A drive mechanism 35, which will be described in greater detail below, interconnects the wide end of the conical roller 25 and the corresponding adjacent end of the cylindrical roller 28 to provide a driven rotation to both sets of rollers 25, 28. Therefore, crop material received into the conical portion 22 of the bale chamber 20 is rotated into a compact conically shaped mass that continues to build as crop material is fed into the conical portion 22 of the bale chamber 20. Then, as more crop material is added into the bale chamber 20, the conically shaped mass within the conical portion 22 has a diameter at the rearward end thereof that is the same diameter as the cylindrical portion 27 of the bale chamber 20. Then, as additional crop material is added into the conical portion 22, the cylindrical bale protrudes upwardly and rearwardly from the cylindrical portion 27 against the rear support plate 30, as will be described in greater detail below.

One skilled in the art will recognize that the drive belt or chain 36 can be rotatably driven from the prime mover either mechanically or hydraulically. Mechanically, the prime mover (not shown) will have a power takeoff that can deliver rotational power to a gearbox (not shown) that can be operatively connected to the drive belt or chain 36 for driving the rollers 25, 28. Alternatively, the power takeoff can drive a hydraulic system to drive the belt or chain 36. Similarly, the rotation of the transfer table 18, or the rotational mechanism associated therewith, can be operatively driven from the mechanical or hydraulic power provided by the prime mover.

Figure 14:
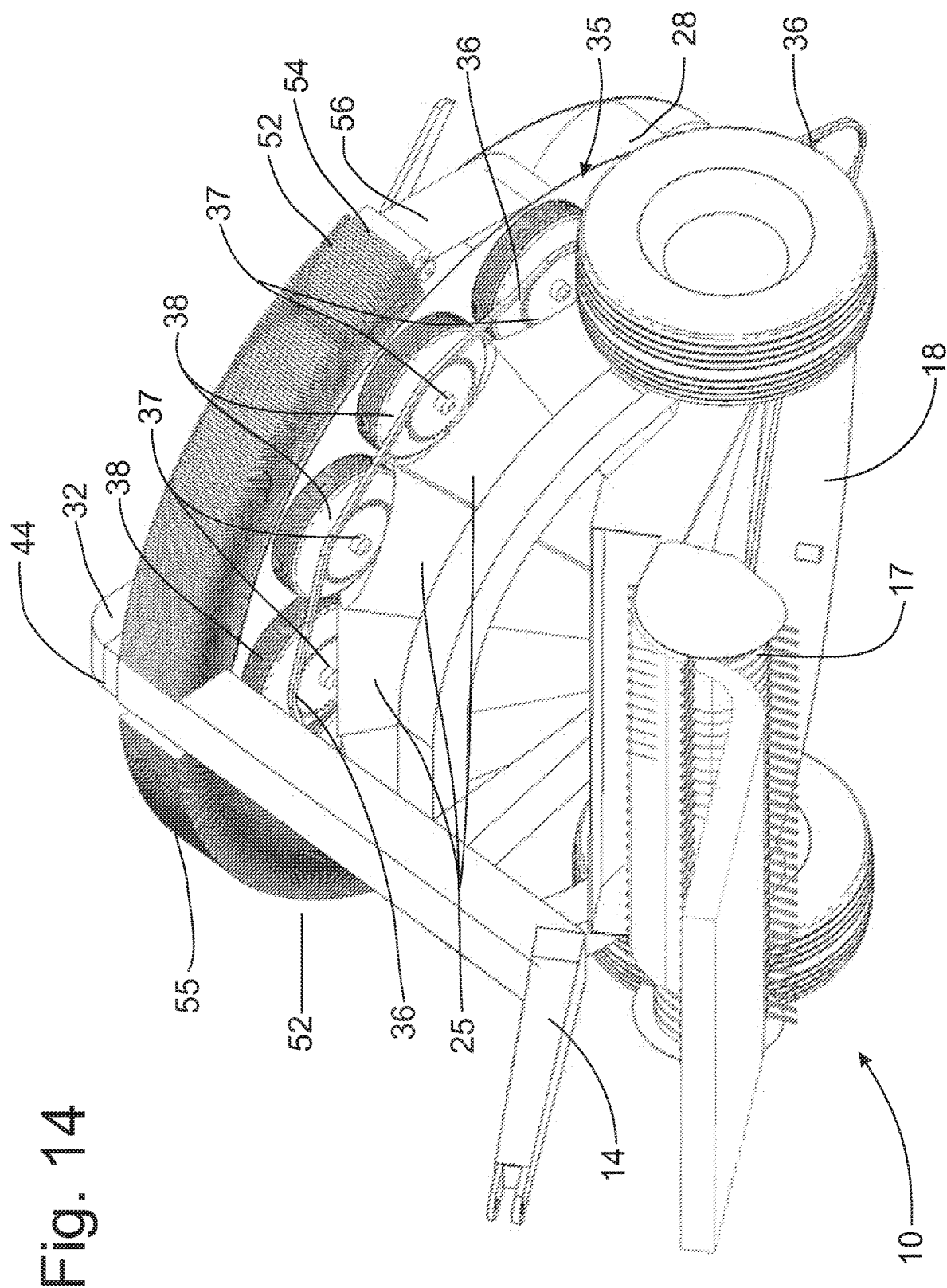
FIG. 14 is a right front perspective view of the continuous round baler showing the folded net wrapping apparatus mounted on the frame of the continuous round baler supporting the rollers of the bale chamber.

The drive mechanism 35 can include a drive belt or chain 36 positioned to wrap partially around a drive sprocket 37 mounted on the forward end of each cylindrical roller 28, as is best seen in FIG. 14. Also mounted on the forward end of each cylindrical roller 28 is a drive transfer member 38 that is rotatable with the driven rotation of the drive sprocket 37. The drive transfer member 38 is shown in FIG. 14 as being an elastomeric wheel that is sized to engage a parallel cuff formed on the inside of each corresponding conical roller 25. Such an arrangement will be operable to transfer rotation to the conical rollers 25 through friction between the elastomeric wheel and the parallel cuff. One skilled in the art will also recognize that other configurations of the drive transfer member 38, such as a pinion engagable with a corresponding rack formed on the parallel cuff, or a bevel gear set, would be operable to transfer rotational power from the drive mechanism 35 to the circular arrangement of conical rollers 25 adjacent to the cylindrical rollers 28.

One skilled in the art will also recognize that dirt and debris, such as crop material fines and dust, are prevalent in the operation of any mechanism that bales crop material. The drive mechanism 35, for the sake of shielding from dirt and debris, but also for the sake of safety, will likely be enclosed by shielding, which is not depicted in the drawings for the purposes of clarity of the component parts of the continuous round baler 10. Likewise, shielding that might be desirable for other operative components, such as the transfer table 18 and the bale severance device 40 are not shown in the drawings to permit a better view of the component parts.

One skilled in the art will recognize that the drive mechanism for the components requiring a driving power to be transmitted thereto can be provided in a variety of different mechanisms, including a gearbox (not shown) optimally positioned to drive the conical rollers 25 and the transfer table 18 and associated mechanisms. One skilled in the art will also recognize that the cylindrical rollers 28 may not have to be driven at all. With the rotation imparted to the conical bale being formed in the conical bale chamber 22 by the conical rollers 25, the bale protruding from the upper portion of the cylindrical rollers 28 may be rotated from the conical bale chamber 22 without requiring a driving power to be delivered to the cylindrical rollers 28. Accordingly, the cylindrical rollers 28 may be simply mounted from the center of the corresponding conical rollers 25 with a bearing permitting rotation thereof due to the engagement with the rotating cylindrical bale protruding from the cylindrical portion of the baler chamber 27, such as is schematically shown in FIG. 17.

Figure 2:
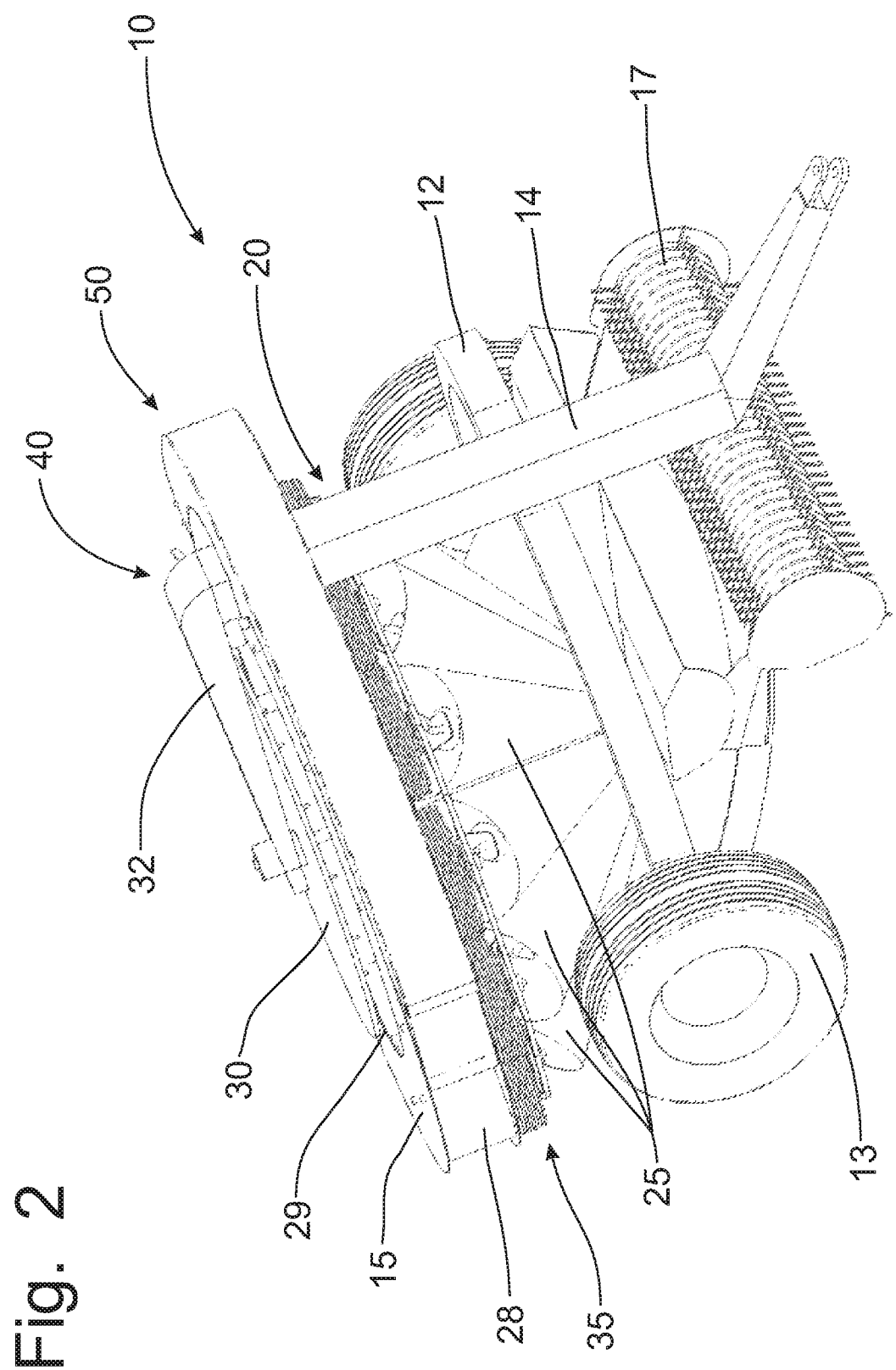
FIG. 2 is a right front perspective view of the continuous round baler shown in FIG. 1.
Figure 3:
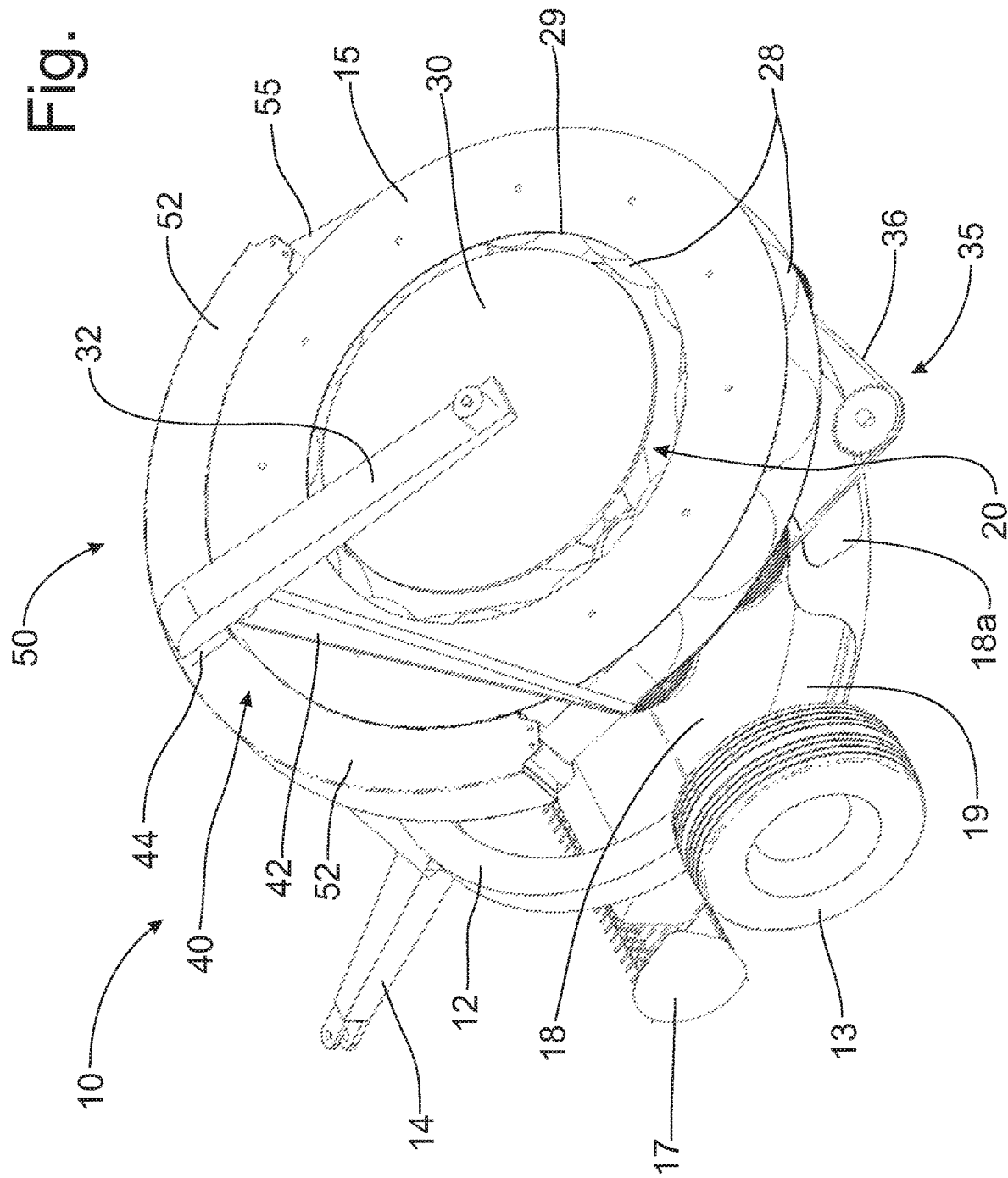
FIG. 3 is a left rear perspective view of the continuous round baler shown in FIG. 1.
Figure 4:
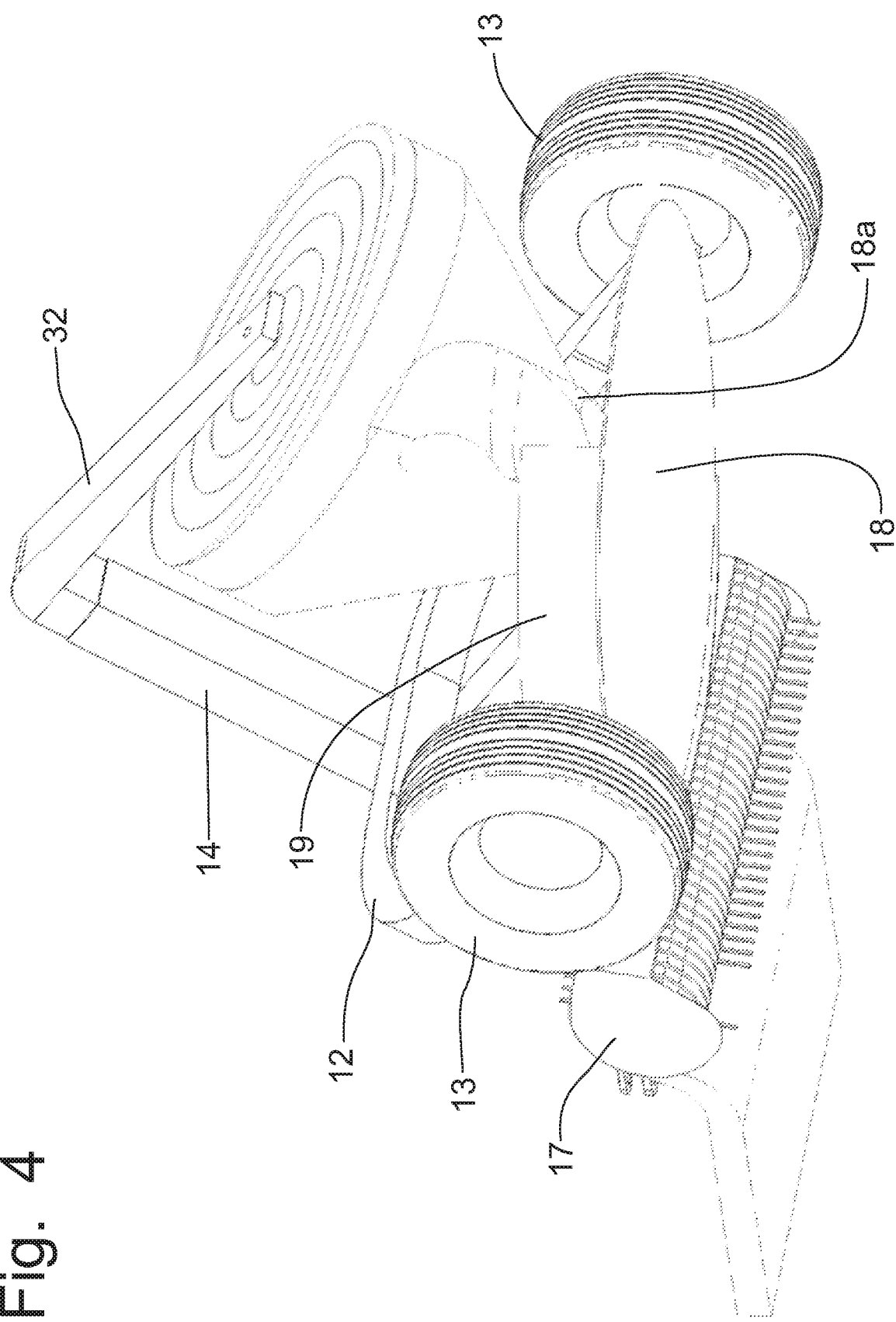
FIG. 4 is a rear perspective view of the continuous round baler with components broken away to better seen the transfer table.
Figure 5:
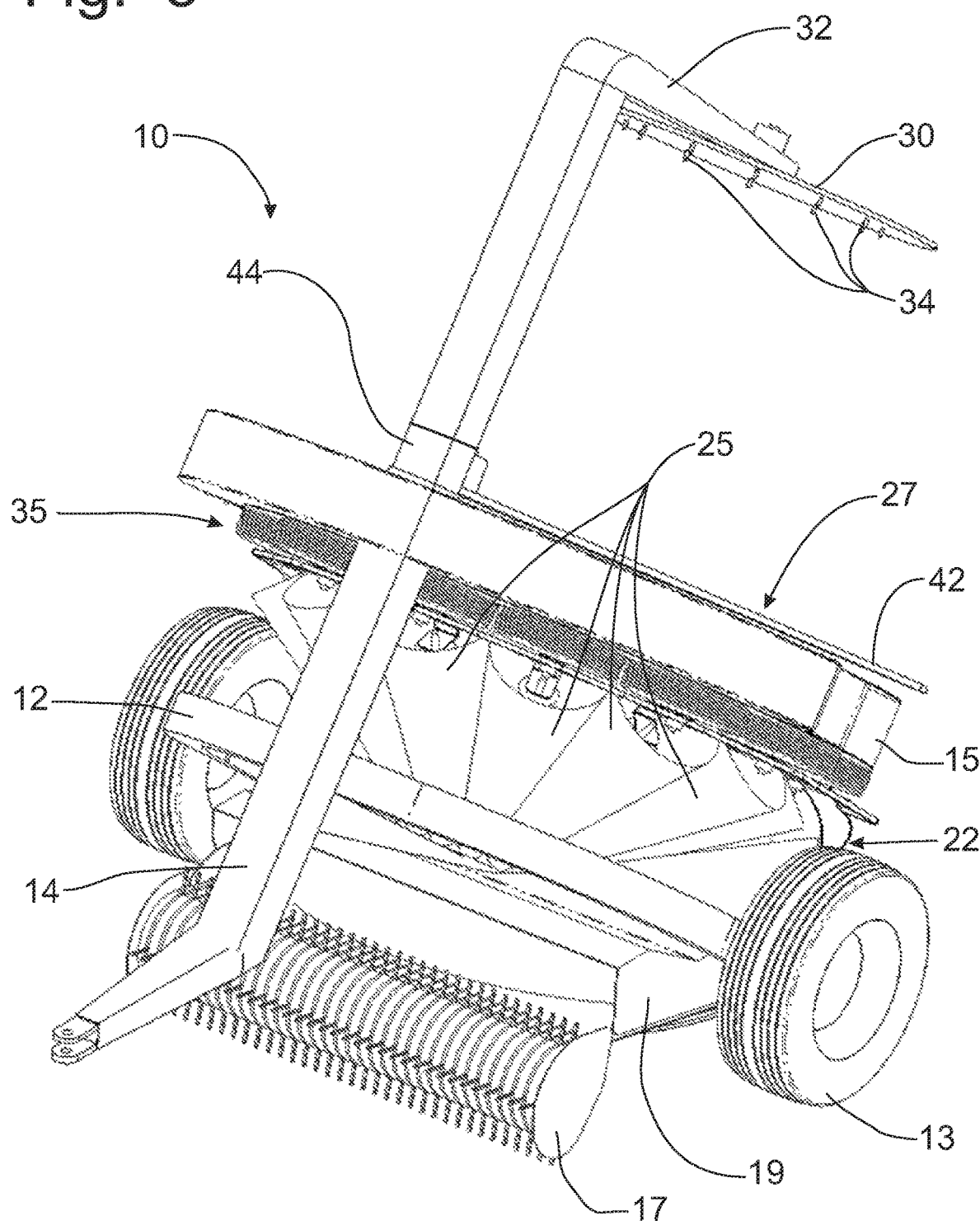
FIG. 5 is left front perspective view similar to that of FIG. 1, but showing the extension of the rear support plate corresponding to a growth of the formed round bale.
Figure 6:
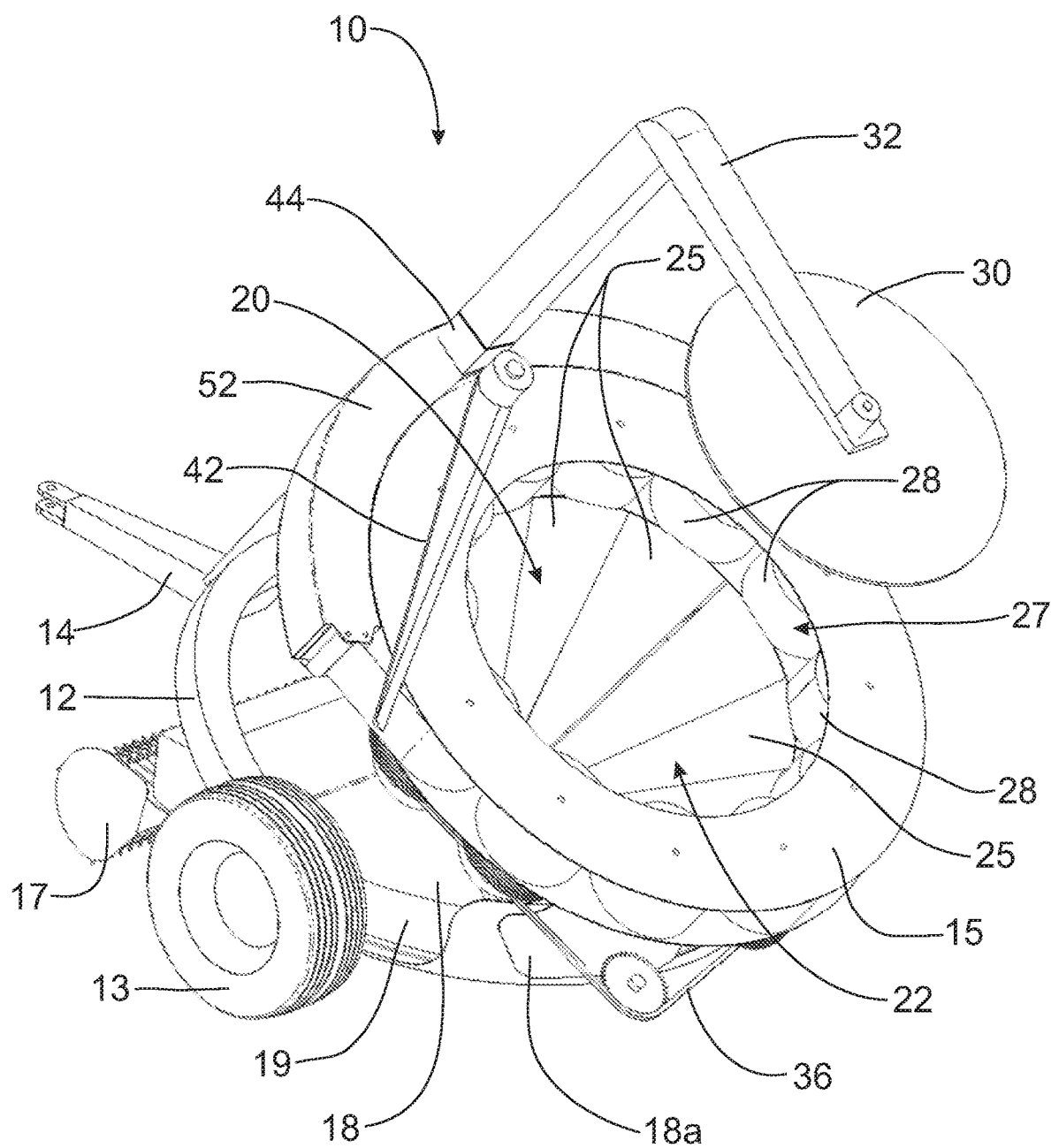
FIG. 6 is an upper perspective view of the continuous round baler with the rear support plate displaced rearwardly to permit a view of the rollers internal of the bale chamber.

The rear support plate 30 is rotatably supported at the rearward end of a support beam 32 telescopically received within the rearward end of the draft tongue 14. The telescopic movement of the support beam 32 can either be powered to correspond to the advancement of the round bale from the cylindrical portion 27 of the bale chamber 20, or be spring-loaded toward the collapsed orientation, as shown in FIGS. 1-3, so that the rear support plate 30 supports the rearward end of the formed round bale and the bale protrudes from the cylindrical portion 27 of the bale chamber 20. The rear support plate 30 could be hydraulically powered with density being controlled through a hydraulic relief valve (not shown) and the rear support plate 30 being returned to the home position hydraulically. Preferably, the rear support plate 30 will be formed with teeth 34 mounted on the bale facing side of the plate 30 so that the end of the protruding round bale will be fully engaged and supported. Alternatively, the rear support plate 30 could be formed in a cup-shape (not shown) such that the sides of the rear support plate 30 could engage the sides of the cylindrical bale around the distal end to provide additional support for the end of the bale. The rotation of the rear support plate 30 will facilitate the rotation of the protruding round bale by the rollers 28 as the bale is being formed and extending out of the bale chamber 20.

The cylindrical round baler 10 is also provided with a bale severance device 40 supported from the rearward end of the draft tongue 14. The purpose of the bale severance device 40 is to cut the continuously protruding round bale into discrete lengths such that the end result is a cylindrical bale lying on the surface of the field as any conventional round baler would have created. Preferably, the telescoping support beam 32 triggers the operation of the bale severance device 40 when the rear support plate 30 has reached a point corresponding to the desired length of the formed round bale. Also preferably the length of the formed round bale can be adjusted to a desired length for the individual operator. Then when the desired length has been attained, the bale severance device will be actuated to sever a round bale from the continuous round baler at the appropriate length.

The bale severance device 40 preferably includes a powered knife 42 that swings through an arc to sever the round bale at the desired length. Preferably, the knife 42 is carried on a collar 44 that is engagable by the telescoping support beam 32 and movable along the rearward end of the draft tongue 14 with the telescoping support beam 32 so that the knife 42, once actuated, moves rearwardly with the support beam 32 and rear support plate 30 to maintain a parallel cut as the round bale continues to protrude from the bale chamber 20. The movement of the knife 42 can be powered hydraulically from the prime mover (not shown), such as via the movement of a hydraulic cylinder (not shown).

One skilled in the art will recognize that a number of different knife 42 configurations can be utilized in the operation of the bale severance device. Instead of a single blade powered through a cutting arc, as depicted in FIGS. 9-13, the knife 42 could be a rotating blade, or a fine chain, such as a chain saw, or a pair of reciprocating blades. Furthermore, the length of the knife 42 does not have to be as long as the diameter of the formed round bale. The knife blade 42 could be slightly longer than half the diameter so that the formed round bale would have to rotate at least one revolution during the operation of the bale severance device to affect a complete severing of the bale from the round bale extrusion.

Figure 8:
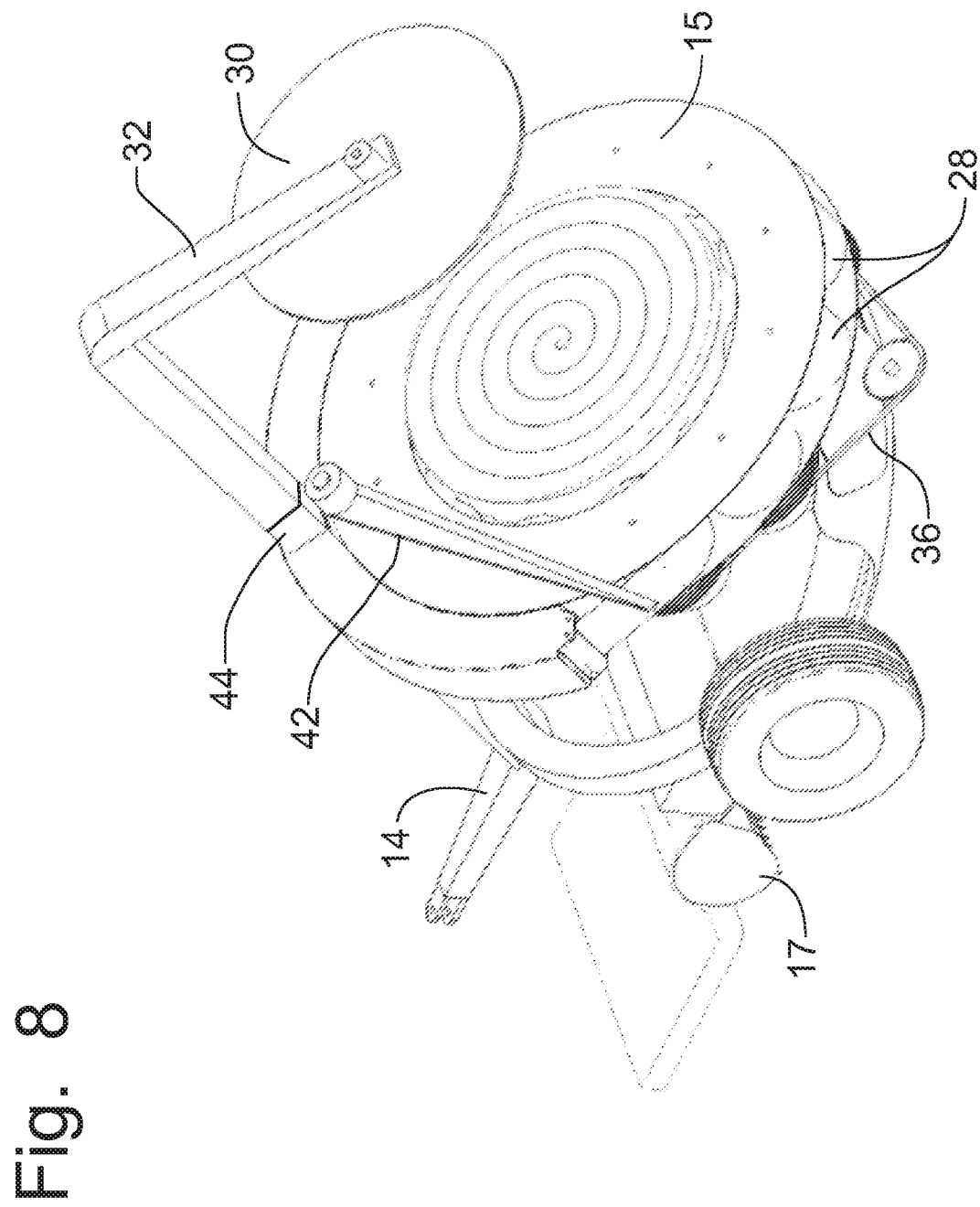
FIG. 8 is an upper perspective view similar to that of FIG. 6, but showing the beginning of the formation of a round bale extending rearwardly from the bale chamber, the rear support plate being displaced rearwardly to permit a view of the formed round bale.
Figure 11:
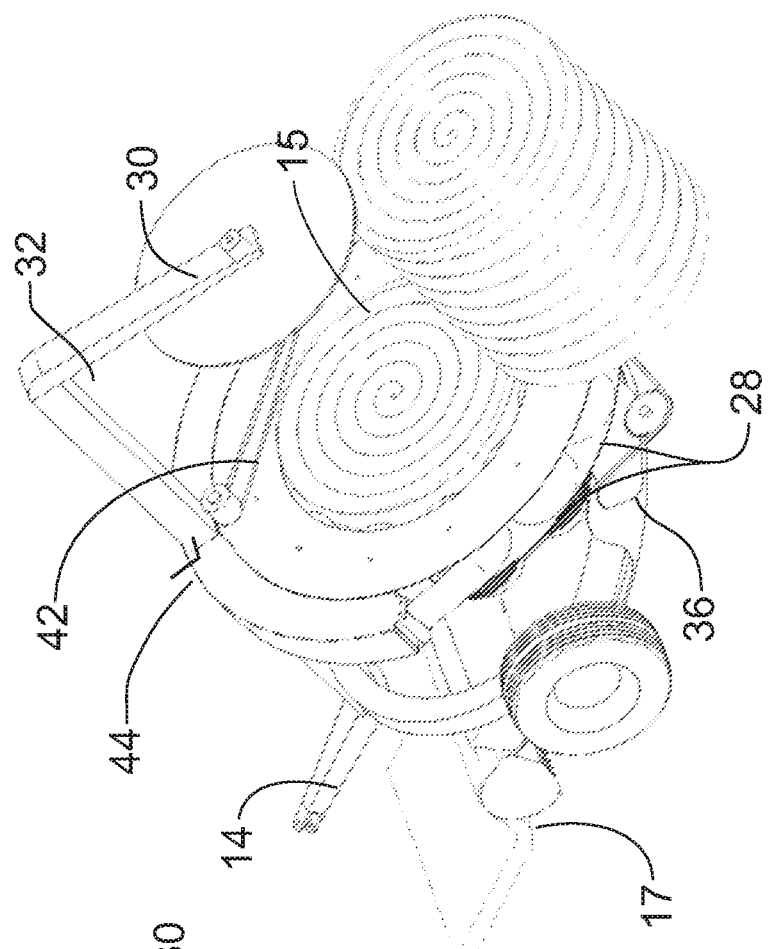
FIG. 11 is an upper perspective view similar to that of FIG. 10 but with the bale severance device completing the cutting cycle.
Figure 12:
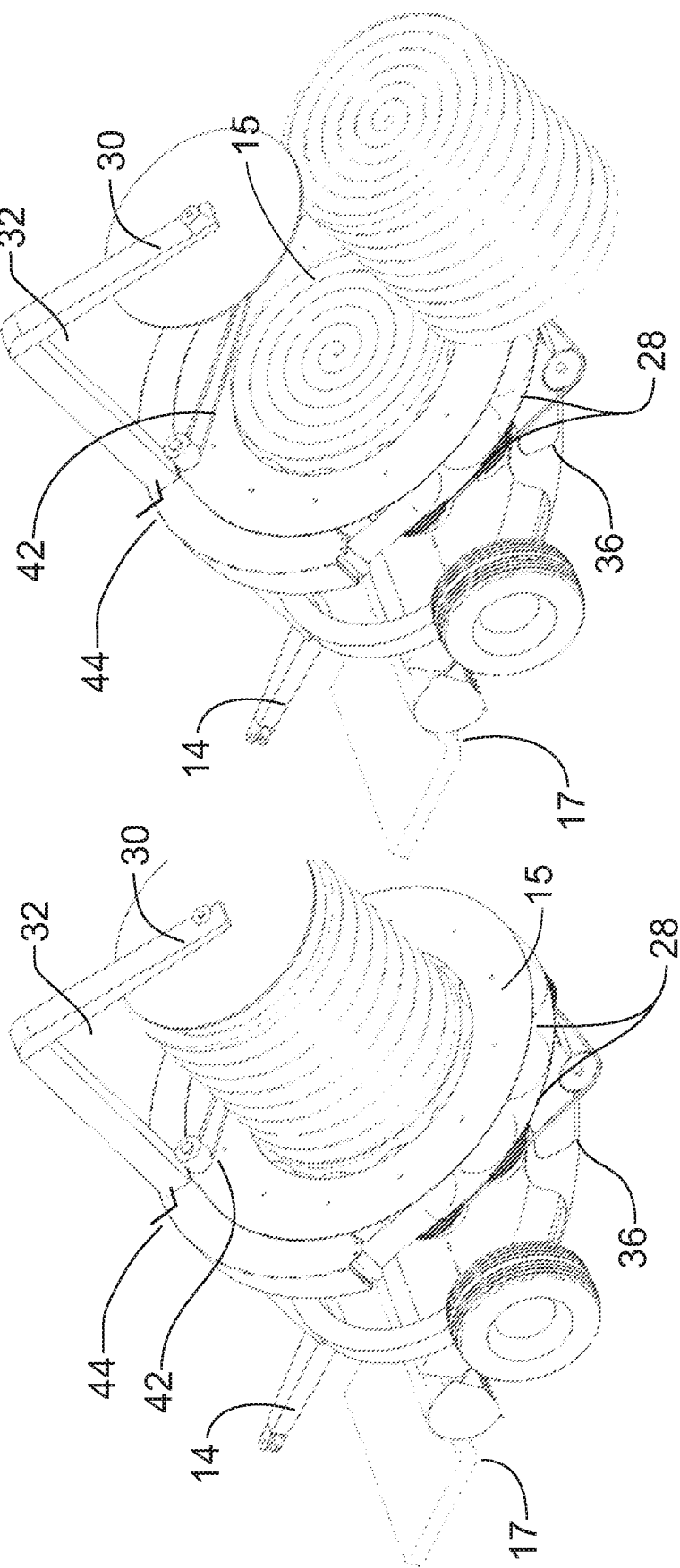
FIG. 12 is an upper perspective view similar to that of FIG. 11 but with the severed round bale falling from the rear support plate to the ground.
Figure 13:
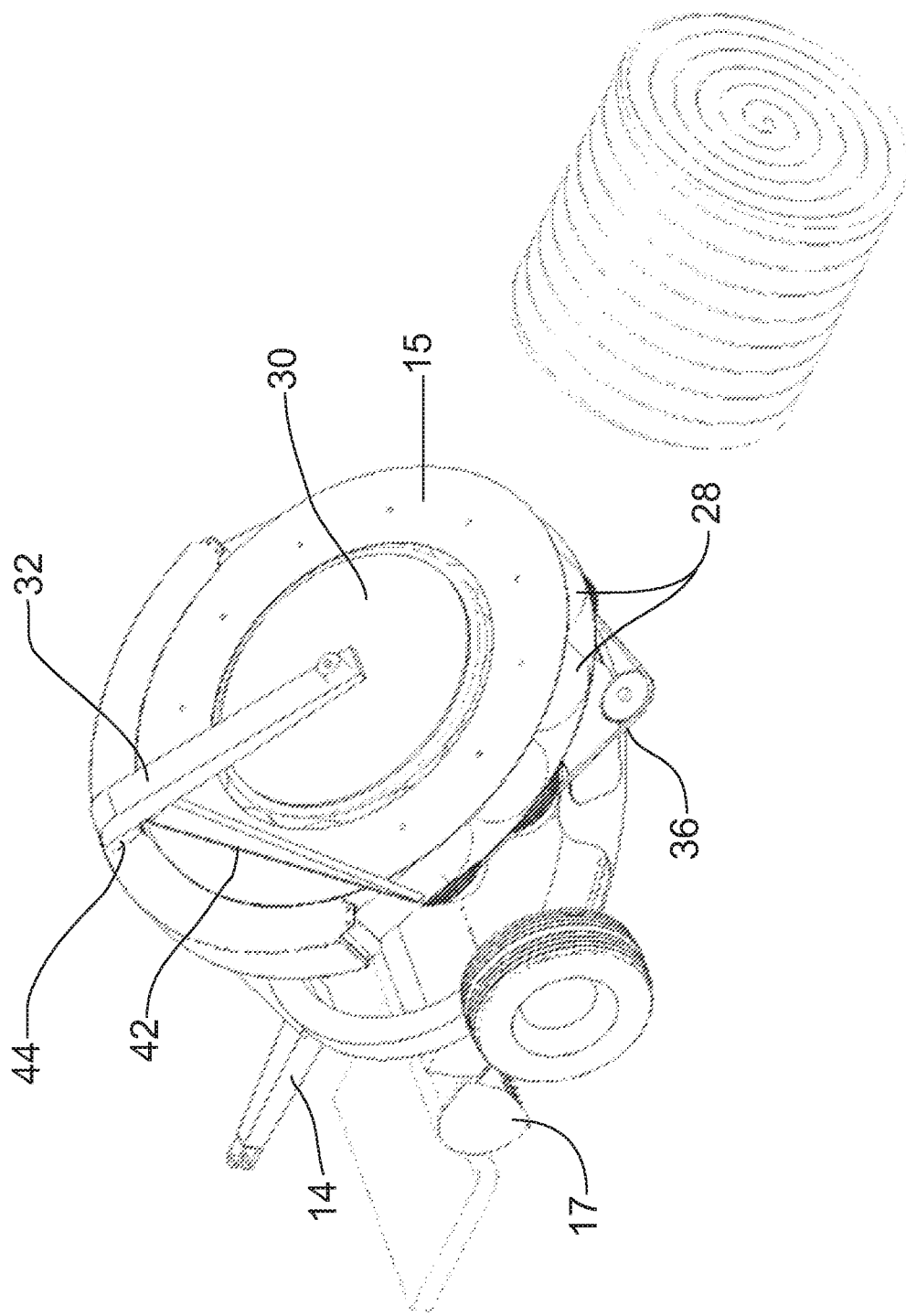
FIG. 13 is an upper perspective view similar to that of FIG. 12 but with the rear support plate re-positioned to support the rearward end of the round bale being formed.

With reference to FIGS. 8-13, one skilled in the art can see the progression of the extrusion of the round bale from the bale chamber 20 and the operation of the bale severance device to form a conventional looking round bale. In FIG. 8, although the rear support member 30 would be in the same position as depicted in FIG. 13, the displaced rear support plate 30 reveals the formation of the round bale within the bale chamber 20, formed by feeding crop material from the transfer table into the conical portion 22 of the bale chamber 20 with the full diameter round bale filling the cylindrical portion 27 of the bale chamber. One skilled in the art will recognize that the placement of the rear support member 30 at the end of the cylindrical portion 27, as depicted in FIG. 13, the formation of the cylindrical bale is enhanced and facilitated as the crop material has to tightly compact in the cylindrical form protruding from the bale chamber 20.

Figure 9:
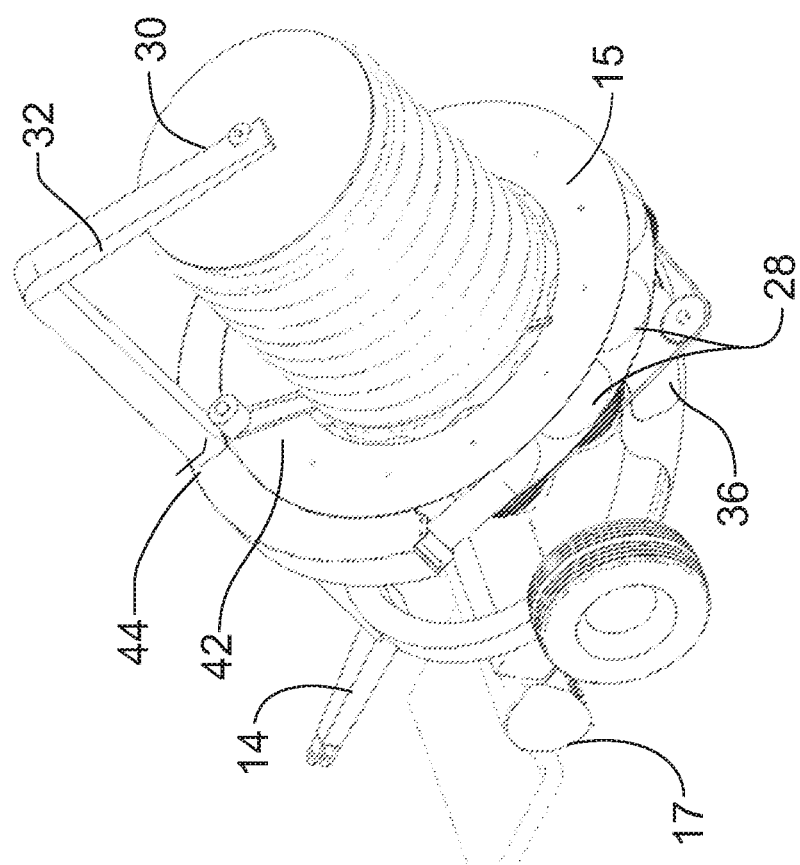
FIG. 9 is an upper perspective view similar to that of FIG. 8, but showing a formed round bale extending rearwardly and being supported between the bale chamber and the rear support plate with the bale severance device being ready for actuation.
Figure 10:
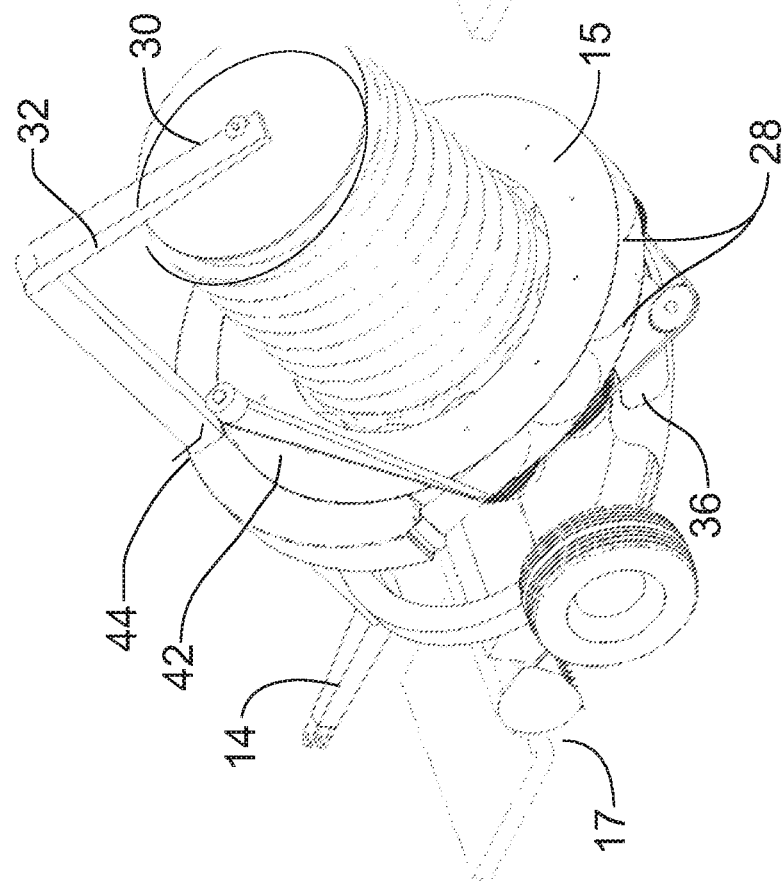
FIG. 10 is an upper perspective view similar to that of FIG. 9 but with the bale severance device partially through the cutting cycle.

The round bale continues to grow with the continuing addition of more crop material into the conical portion 22 and advances the extrusion of the round bale from the bale chamber 20 against the rear support plate 30. Eventually, the protruded round bale reaches a length deemed desirable by the operator, as is represented in FIG. 9, and the bale severance device 40 is actuated, preferably automatically, as opposed to being manually actuated, so that uniform bale lengths will be attained. The bale severance device 40 severs through the protruded round bale, even as the protruded bale continues to be rotated with the rollers 25, 28, as is depicted in FIGS. 10 and 11. The severed round bale then falls from the remaining protruding cylindrical bale and from the rear support plate 30, as depicted in FIG. 12, to fall to the surface of the field. After the severed round bale has been detached and discharged, the support beam 32 collapses to position the rear support plate 30 against the protruding cylindrical bale for continued support thereof during the formation of the next round bale.

The above-described operation of the continuous round baler 10 makes the wrapping of the bale with a conventional net wrapping apparatus (not shown) problematic. One resolution of the problem of applying netting material to the circumferential perimeter of the formed round bale would be to attach a net wrapping apparatus (not shown) to the support beam 32 at the rearward end thereof corresponding to the location of the rear support plate 30. Such a net wrapping apparatus would carry a conventional roll or rolls of netting material to be applied to the outer surface of the formed round bale just prior to actuating the bale severance device 40.

However, a folded net wrap apparatus 50 would provide an improved net wrapping function for the continuous round baler 10. Rather than supplying the netting material on a roll, which requires a core about which the netting material is rolled, the netting material is formed in a folded configuration that is compacted into a pre-formed shape to fit into the supply boxes 52 mounted on top of the roller support member 15 on opposing sides of the draft tongue 14 and telescopic support beam 32. The folding of the netting material can place a larger amount of netting material into a correspondingly sized box because there is no roll core required. Actually, several bundles of folded netting material can be loaded into each of the supply boxes 52 with the tail end of the leading bundle clipped or tied to the leading end of the subsequent bundle of folded netting material until the respective supply box 52 is filled with folded compressed netting material.

Figure 15:
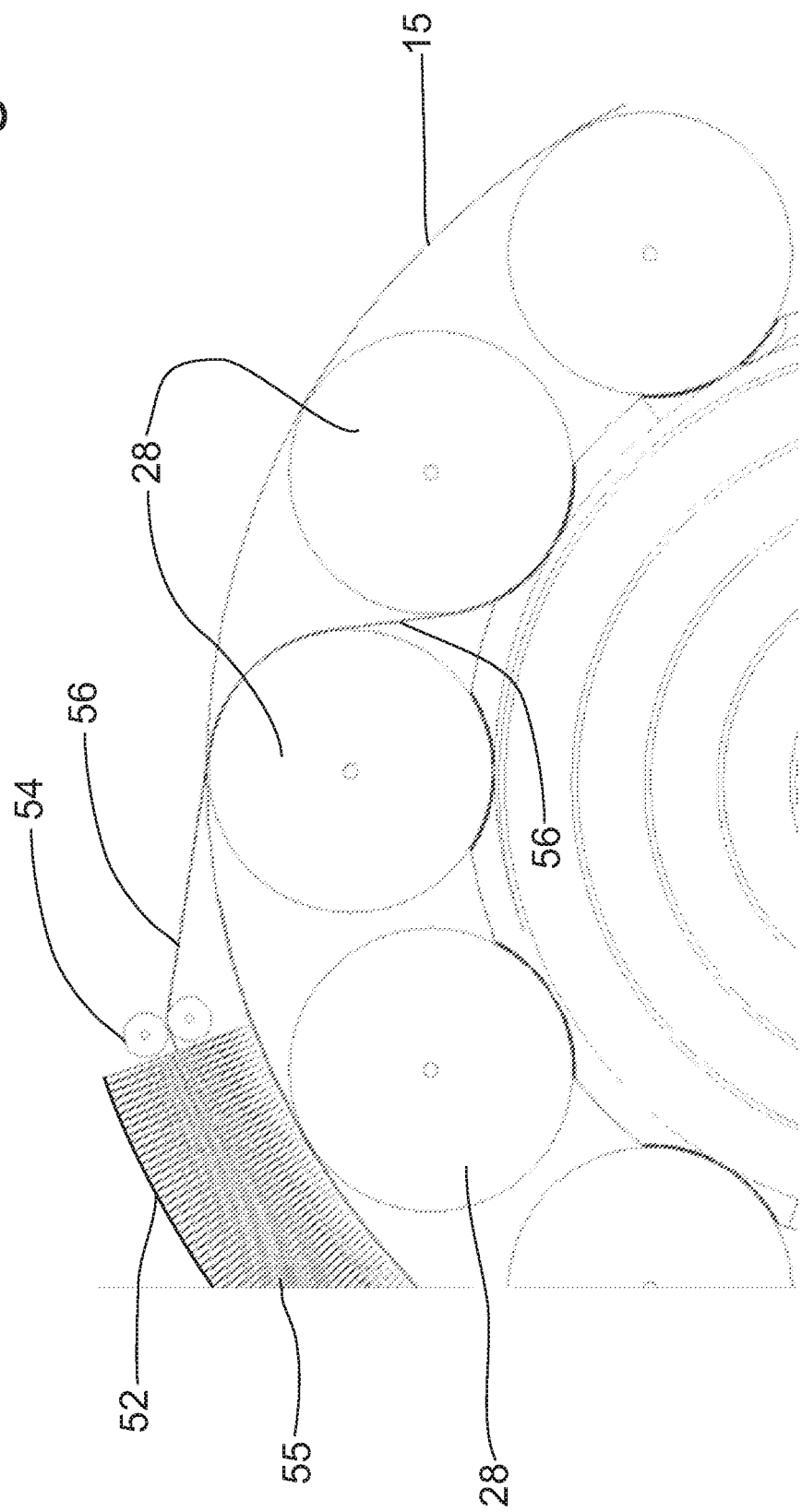
FIG. 15 is an enlarged partial cross-sectional view of the folded net wrapping apparatus with the path of the net passing between rollers for engagement with the formed round bale.
Figure 16:
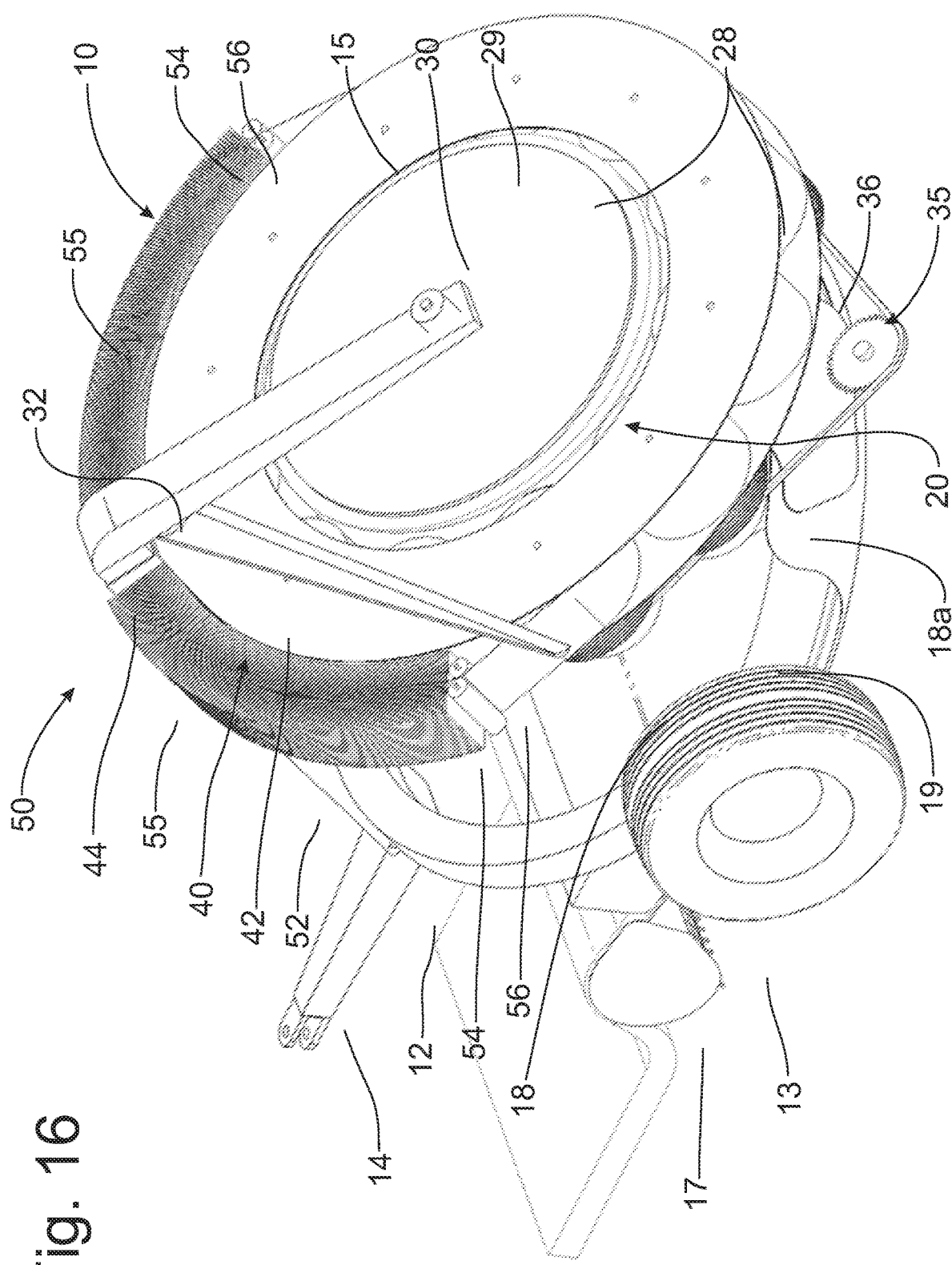
FIG. 16 is a left rear perspective view of the continuous round baler shown in FIG. 14.
Figure 20:
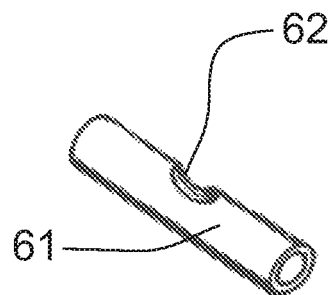
FIG. 20 is a detail perspective view of a portion of the center mounting tube for the netting rolls.

As is best seen in FIGS. 14-16, the netting material 55 can be fed from either one of the supply boxes 52 between two of the cylindrical rollers 28 to be placed into contact with the exterior surface of the formed round bale as the round bale is rotated and protruded within the cylindrical portion 28 of the bale chamber 20. As a result, the netting material 55 would already be applied to the periphery of the round bale as the round bale leaves the bale chamber 20. Since the round bale is both rotating and advancing linearly out of the bale chamber 20, the netting material 55 is applied in a continuous spiral manner around the outer periphery of the formed round bale. Therefore, the stability of the formed round bale between the rear support plate 30 and the bale chamber 20 is enhanced by the application of the netting material 55.

In normal or heavy crop conditions, the amount of crop material being received on the transfer table 18 is sufficient to maintain a continuous operation of the formation of the round bale within the bale chamber 20. As a result, the formed round bale should protrude from the bale chamber in an even manner so that the netting material 55 is applied in an even spiral manner around the formed round bale. However, in light crop conditions, the progress of the bale formation may not be rapid enough to apply the netting material efficiently and effectively.

Therefore, the transfer table 18 can be used as an accumulation chamber to accumulate a sufficient supply of crop material before being fed into the conical portion 22 of the bale chamber 20. In such conditions, the drive mechanism (not shown) can incorporate a drive interrupt apparatus, such as a clutch or an on/off function, so that the rollers 25, 28 will not be rotated until the transfer table 18 is ready to feed crop material into the bale chamber 20. In such situations, the transfer table 18 will continue to operate, as will the crop pick-up mechanism 17, to collect crop material and position the crop material on one side of the transfer table 18 for delivery to the bale chamber 20. A sensor (not shown), either a proximity switch or a volume or a weight sensor, will identify when an adequate amount of crop material has been collected on the transfer table 18. The triggering of the sensor will start the drive for the rollers 25, 28 and allow the feeding of the crop material into the conical portion 22. With the rotation of the rollers 28, the netting material 55 will continue to be drawn from the supply box 52 and applied to the outer periphery of the formed round bale. In this manner, the netting material 55 will not be wasted and will only be applied when the round bale is being formed within the bale chamber 20. Depending on the volume of crop material available to feed into the conical portion 22, the drive interrupt apparatus could simply slow the rotation of the rollers 25, 28, instead of stopping them completely, to provide proper feeding of the crop material into the conical portion 22.

The folded net wrap apparatus can also be utilized by conventional round balers. Instead of a roll of netting material, the supply boxes can be filled with folded netting material which would enable a larger supply of netting material to be carried by a conventional round baler. Although the width of the netting material would be the same as is carried on the conventional rolls, the leading and trailing ends of the bundles of folded netting material would be coupled or tied together to make a long supply of netting for application to the net wrapping mechanism without requiring a change in the mechanisms. The operator would have longer periods of application of netting material between re-loadings of the supply boxes, and the loading of the netting material would be easier since the lack of a core would make the netting bundles lighter and easier to handle.

One skilled in the art will recognize that the above-described continuous round baler 10 presents a lightweight, compact round bale forming machine that is much smaller and less complex than most conventional round balers, and certainly smaller and significantly less complex than known continuous round balers. The operation of the continuous round baler 10 to collect crop material from the field is never interrupted, while the formation of the round bale is genuinely continuous, unless the machine 10 is encountering light crop conditions and the operator desires to interrupt the bale formation process as the crop material is accumulated on the transfer table 18 before re-starting the rotation of the rollers 25, 28 and feed the accumulated material into the bale chamber 20.

Alternative net wrapping apparatus and bale severance devices can be seen in FIGS. 17-43. Looking first at FIGS. 17-30, an alternative net wrapping mechanism utilizing small width rolls of netting material instead of the folded netting material disclosed above. The configuration of the round baler 10 is essential the same as described above with like reference numbers being used for like components. Instead of a folded net wrapping mechanism 50, this alternative roll net wrapping mechanism 60 utilizes a plurality of small width rolls of netting material, similar to conventional netting material except having a small axial width. The width of the rolls of netting material is intended to be substantially equal to the height of the cylindrical rollers 28, although depending on the rotational speed of the cylindrical bale at the location of the cylindrical rollers 28, the width of the netting material could be smaller than the height of the cylindrical rollers 28.

Figure 21:
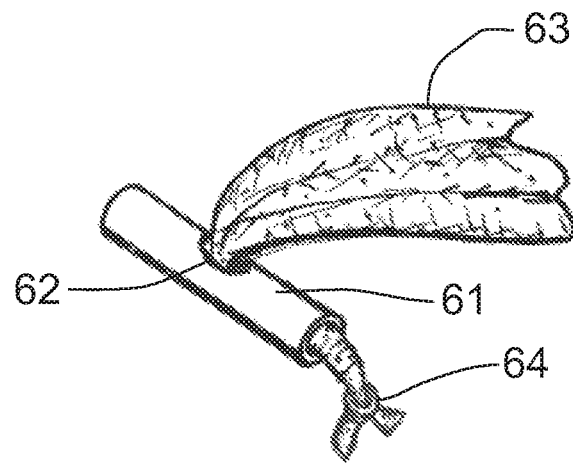
FIG. 21 is a detail view of the center mounting tube with the tail end of the netting material placed through the access opening and knotted.

The roll net wrapping mechanism 60 is preferably mounted along the front of the baler 10 and configured to feed netting material between the cylindrical rollers 28 for application to the formed cylindrical bale while in engagement with the cylindrical rollers 28. The small width rolls of netting material are numbered 1-4 in the drawings to reflect the order of utilization. The rolls of netting material 1-4 are mounted on a center mounting tube 61, best seen in FIGS. 20-22. The center mounting tube 61 is hollow and formed with an access opening 62 in the circumference to gain access to the central hollow of the center mounting tube 61. As depicted in FIG. 21, the tail end 63 of the netting material at the center of the roll 1-4, is fed into the access opening and then through the end of the center mounting tube 61 so that a knot 64 can be formed therein before being pulled back into the central hollow of the center mounting tube 61. The roll of netting material is then mounted on the center mounting tube 61 and then supported on the front of the baler 10.

Figure 22:
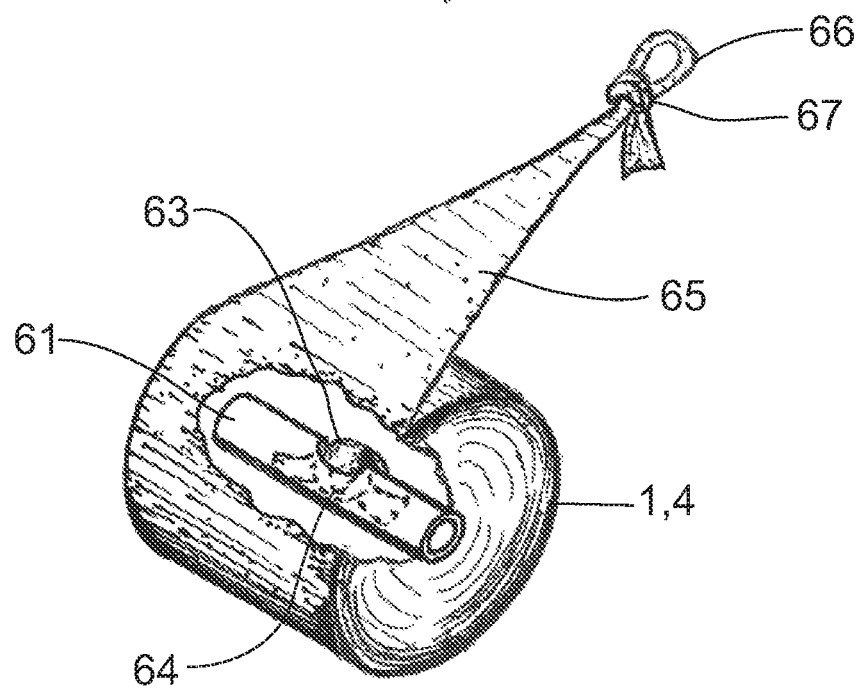
FIG. 22 is a perspective detail view of one of the netting rolls with a central portion thereof broken away to view the center mounting tube.
Figure 23:
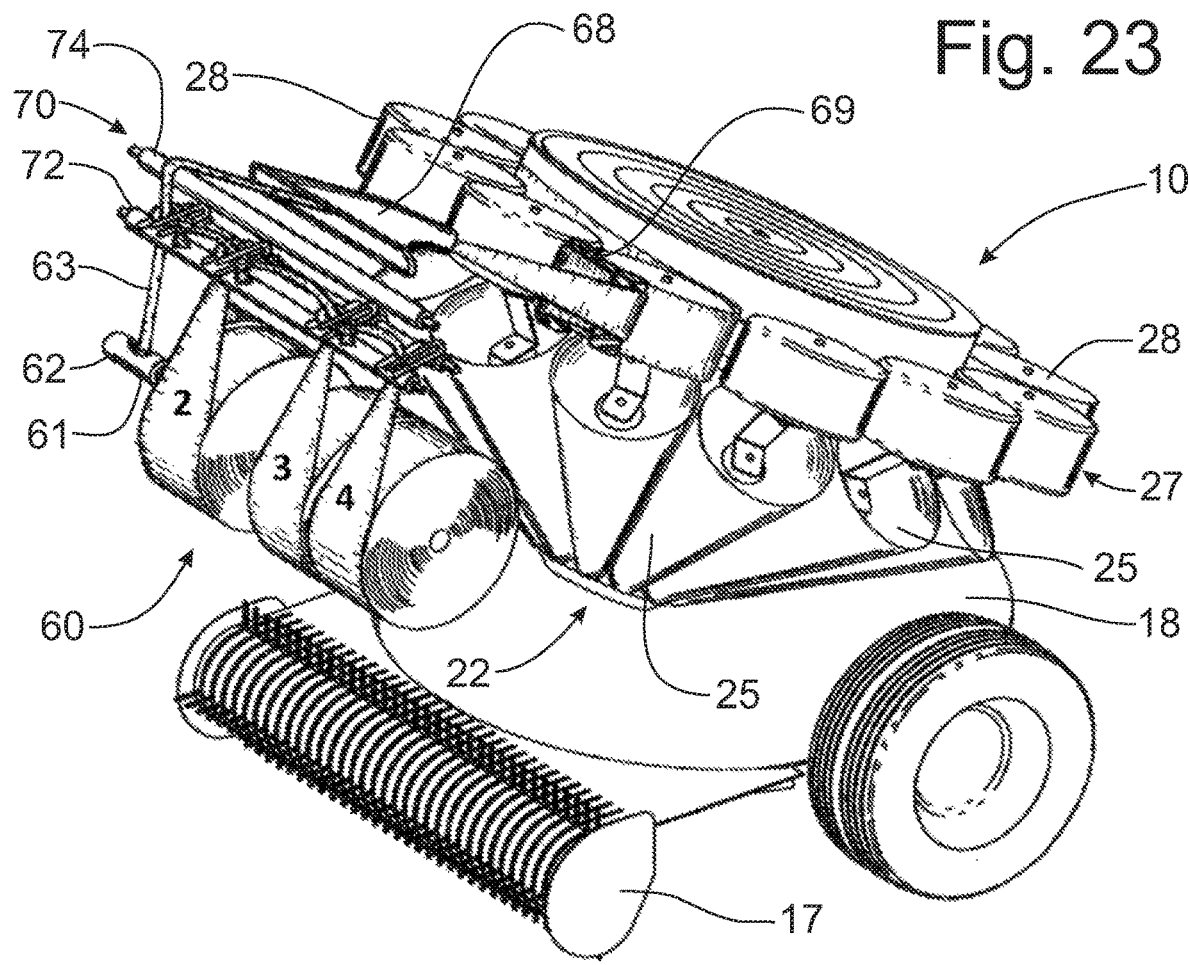
FIG. 23 is a schematic perspective view of the continuous round baler with the alternative net wrapping apparatus showing the exhaustion of the first roll of netting with the knotted tail end of the netting still positioned within the center mounting tube.
Figure 24:
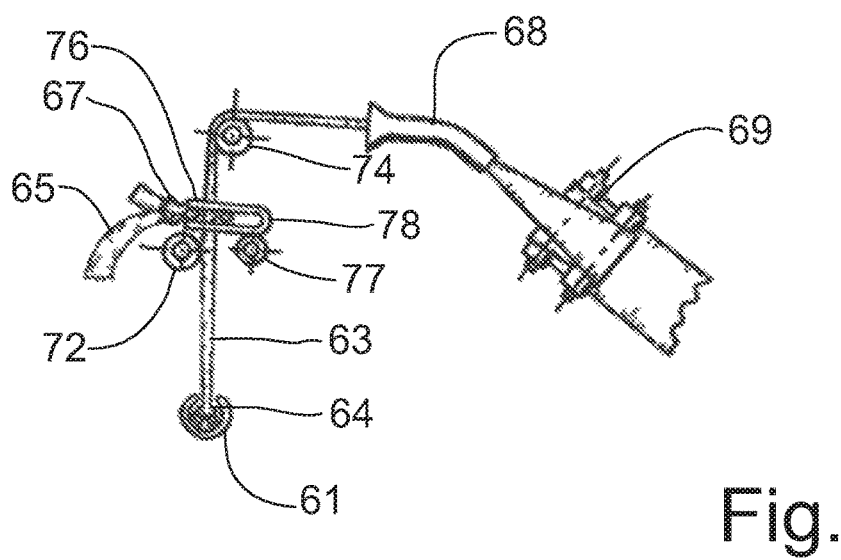
FIG. 24 is a partial side elevational view of the alternative net wrapping apparatus showing the exhaustion of the first roll of netting material with the knotted tail end of the netting roll positioned within the center mounting tube.
Figure 25:
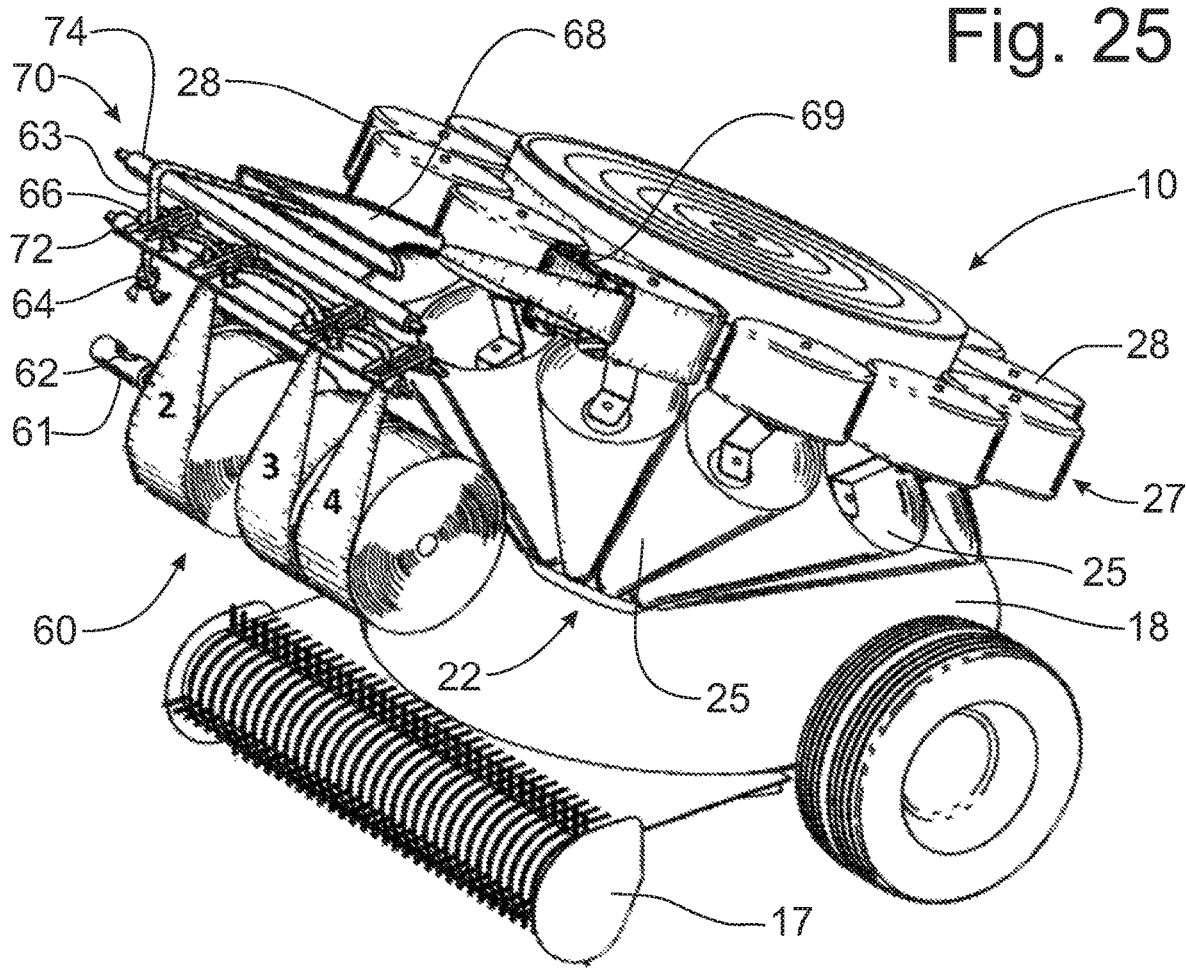
FIG. 25 is a schematic perspective view of the continuous round baler with the alternative net wrapping apparatus showing the exhaustion of the first roll of netting with the knotted tail end approaching the interlocking mechanism to initiate the utilization of the second roll of netting material.
Figure 26:
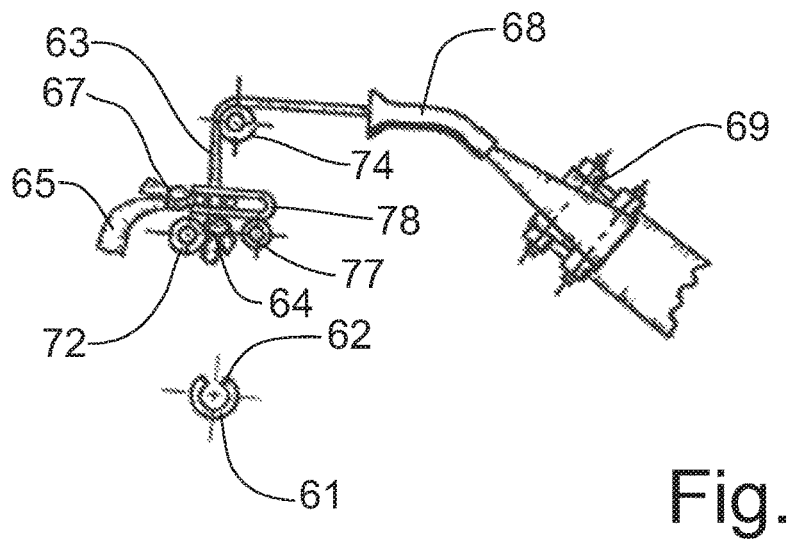
FIG. 26 is a partial side elevational view of the alternative net wrapping apparatus showing the exhaustion of the first roll of netting with the knotted tail end approaching the interlocking mechanism to initiate the utilization of the second roll of netting material.
Figure 27:
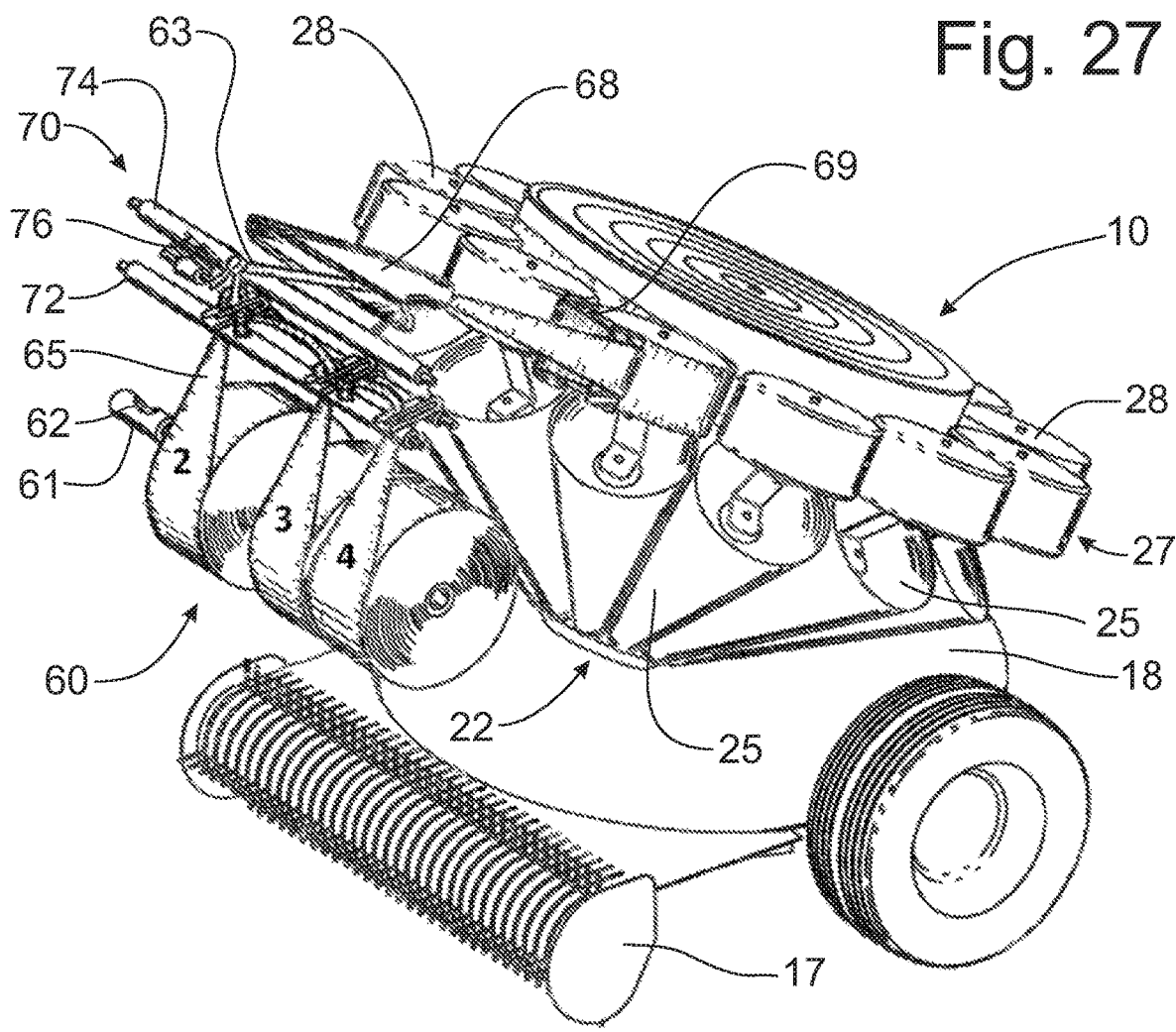
FIG. 27 is a schematic perspective view of the continuous round baler with the alternative net wrapping apparatus showing the engagement of the second roll of netting material with the first segment of the interlocking mechanism rotated into an inoperative position.

The head end 65 of the netting material on the roll 1-4 is then looped and knotted as shown in FIG. 22 to form an interlock loop 66 as depicted in FIG. 22. With all rolls of netting material, four being shown in FIG. 17, although the number of rolls will be determined by the size of the baler 10 and the width of the rolls 1-4, mounted on the front of the baler 10 for rotational movement to dispense the netting material from the rolls 1-4, the interlock mechanism 70 is utilized to engage each of the rolls of netting material 1-4 for sequential utilization to dispense netting material into the net wrapping apparatus 60. Preferably, manufacturers of netting material would pre-form these small width rolls of netting material with the knotted tail end 63 already positioned within a center mounting tube 61 on which the roll of netting material is mounted, and with an interlock loop 66 appropriately sized and formed in the head end 65 of the netting material. Manufacturers of netting material may only wedge the knotted tail end 63 on the center mounting tube 61 as the tail end knot 64 would not necessarily be required to reside internally of the center mounting tube 61. Then the operator can simply mount and engage the interlock loops 66 as described in greater detail below.

The interlock mechanism 70 is best seen in FIG. 19. The interlock mechanism 70 includes a first guide bar 72 and a second guide bar 74 positioned above the first guide bar 72 for engagement with the netting material to assist in maintaining tension in the netting material. A loop holder mechanism 75 holds the interlock loops through a plurality of loop holders 76 with each loop holder 76 being pivotally supported on a support bar 77 to permit each loop holder 76 to pivot between an active position and an inactive position, as will be described in greater detail below. As best seen in FIG. 19, each loop holder 76 includes a U-shaped knot retainer 78 having an open end and a flange 79 spaced from the knot retainer 78. The entire loop holder mechanism 75 pivots about an axis defined by the support bar 77 with each loop holder 76 pivoting independently of each other loop holder 76. Although four loop holders 76 are shown in the drawings, one skilled in the art will understand that each roll of netting material mounted in the roll net wrapping apparatus 60 should be provided with a corresponding loop holder 76.

Once mounted on the front of the baler 10, the head end 65 each roll of netting material is passed through the interlock loop 66 of the next sequential roll and then positioned in the loop holder 76 of the previous sequential roll with the knot 67 located on the adjacent side of the U-shaped knot retainer 78 and the netting material passed through the U-shaped knot retainer 78 so that the interlock loop 66 rests on the flange 79. More specifically utilizing four rolls of netting material as is shown in FIG. 17, the rolls of netting material 1-4 are mounted in the following manner. The head end of the netting material on roll 4 is passed behind the first guide bar 72 and then passed between the corresponding U-shaped knot retainer 78 and the flange 79. The interlock loop 66 is then moved to the loop holder 76 corresponding to roll 3 with the knot 67 on the adjacent side of the U-shaped knot retainer 78 and the interlock loop 66 resting on the flange 79 of the loop holder 76 for roll 3.

The head end 65 of the netting material on roll 3 is then passed behind the first guide bar 72 and then upwardly through the interlock loop 66 of roll 4. As with the head end 65 of roll 4, the interlock loop 66 is passed through the U-shaped knot retainer 78 to keep the knot 67 on the adjacent side thereof and the interlock loop resting on the flange 79 of the loop holder 76 for roll 2. Similarly, the head end 65 of the netting material from roll 2 is passed behind the first guide bar and then upwardly through the interlock loop 66 of roll 3. The head end 65 for roll 2 is then moved through the loop holder 76 for roll 1 with the knot 67 on the adjacent side of the knot retainer 78 and the interlock loop 66 resting on the flange 79 of the loop holder 76 for roll 1.

The head end of roll 1 is then passed behind the first guide bar 72 and upwardly through the interlock loop 66 of roll 2. The head end 65 of the netting material for roll 1 is then passed upwardly in front of the second guide bar 74 and wrapped over the second guide bar 74 for entrance into and through the net receiver 68 followed by engagement with the net spreader rolls 69. If more than four rolls of netting material are used, the additional rolls are connected to the interlock mechanism 70 as iterations of the procedure described above. The spreader rolls 69 operate to spread the netting material received from the net receiver 68 to the width required for application to the cylindrical bale which is accomplished by passing between selected cylindrical rollers 28. It will be recognized by one skilled in the art that the receiving opening of the net receiver is wide transversely to receive netting material from all four rolls. The discharge opening of the net receiver, however, is small to provide a consistent point of application of the netting material to the spreader rolls 69.

Looking then at FIGS. 17-30, the operation of the roll net wrapping apparatus 60 can best be seen. The netting material is dispensed from roll 1 through the net receiver 68 and to the spreader rolls 69 for application between cylindrical rolls 28 to the engaged cylindrical bale until the supply of netting material on roll 1 is exhausted. As seen in FIGS. 23-26, the exhaustion of netting material on roll 1 results in the tail end knot 64 being popped from the access opening 62 and passing upwardly to engage the interlock loop 66 of roll 2. As depicted in FIGS. 27-30, the tail end knot 64 is sized so that the tail end knot 64 cannot pass through the interlock loop 66. As a result, the interlock loop 66 of roll 2 is carried along with the tail end knot 64 of roll 1 into the net receiver.

Figure 28:
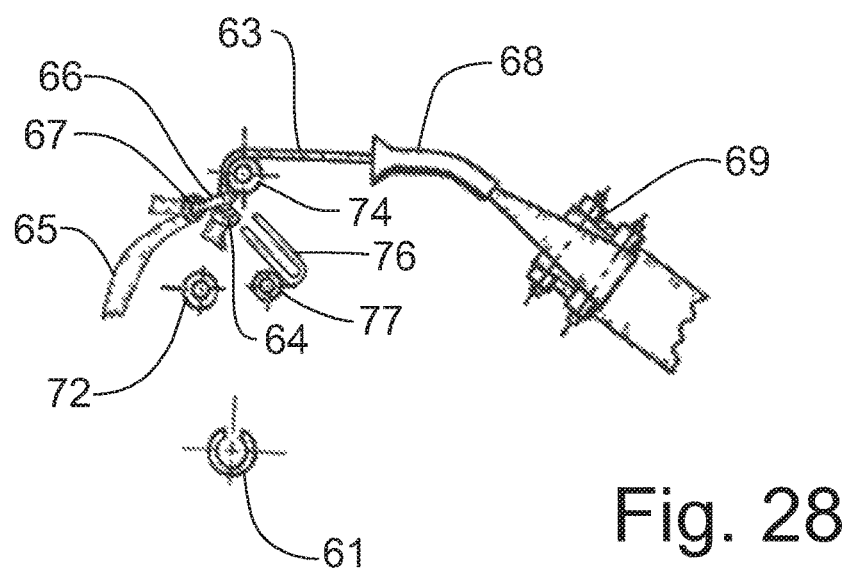
FIG. 28 is a partial side elevational view of the alternative net wrapping apparatus showing the engagement of the second roll of netting material with the first segment of the interlocking mechanism rotated into an inoperative position.
Figure 29:
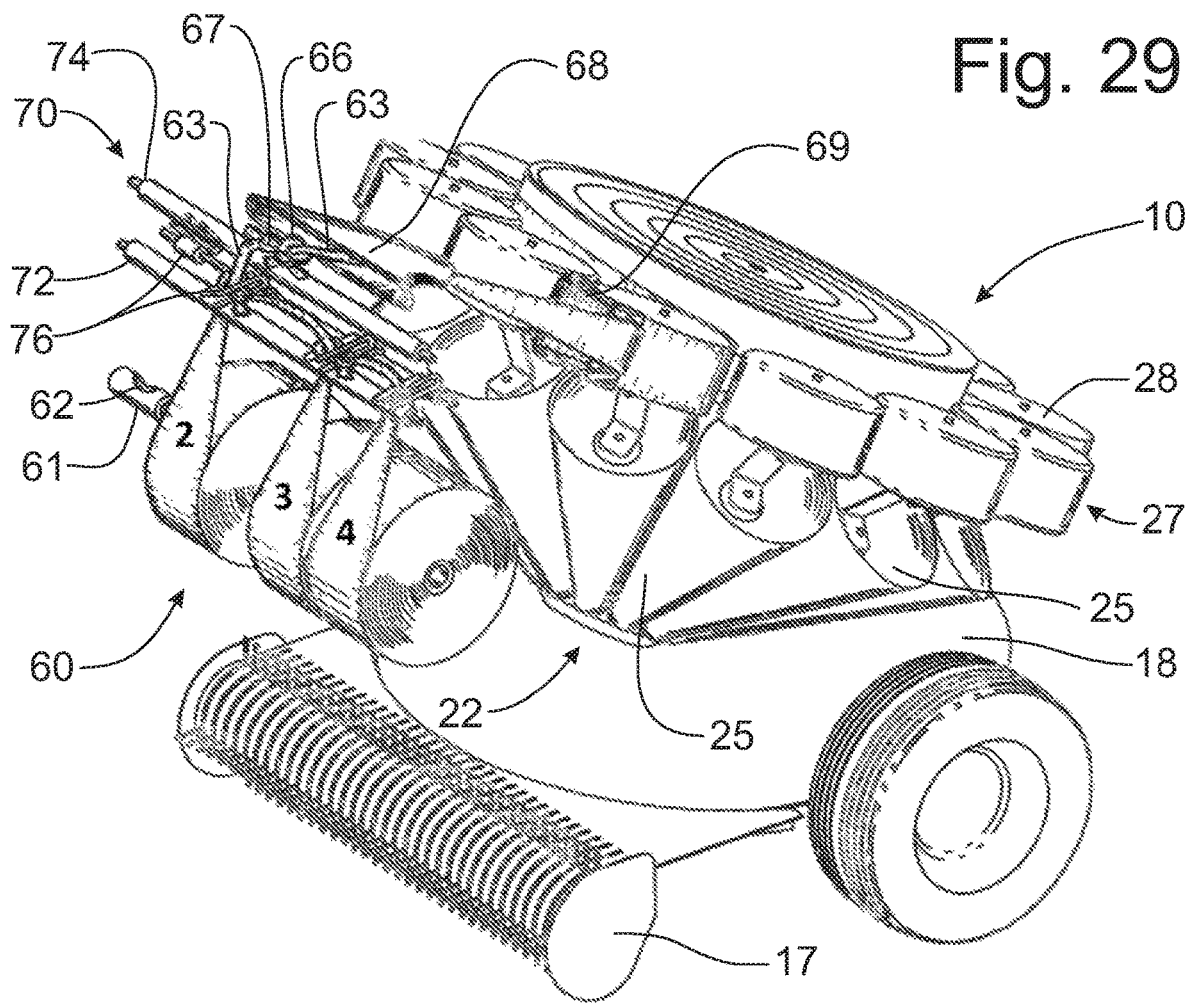
FIG. 29 is a schematic perspective view of the continuous round baler with the alternative net wrapping apparatus utilizing the second roll of netting material.
Figure 30:
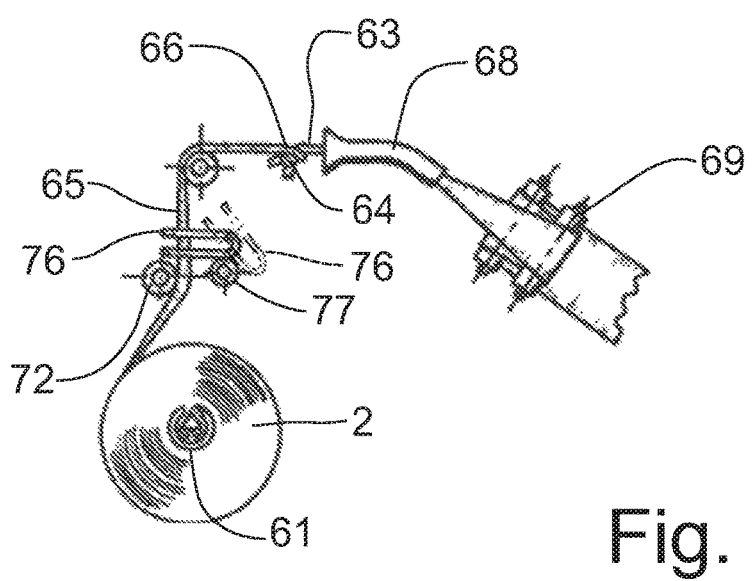
FIG. 30 is a partial side elevational view of the alternative net wrapping apparatus utilizing the second roll of netting material.
Figures 31A, 33:
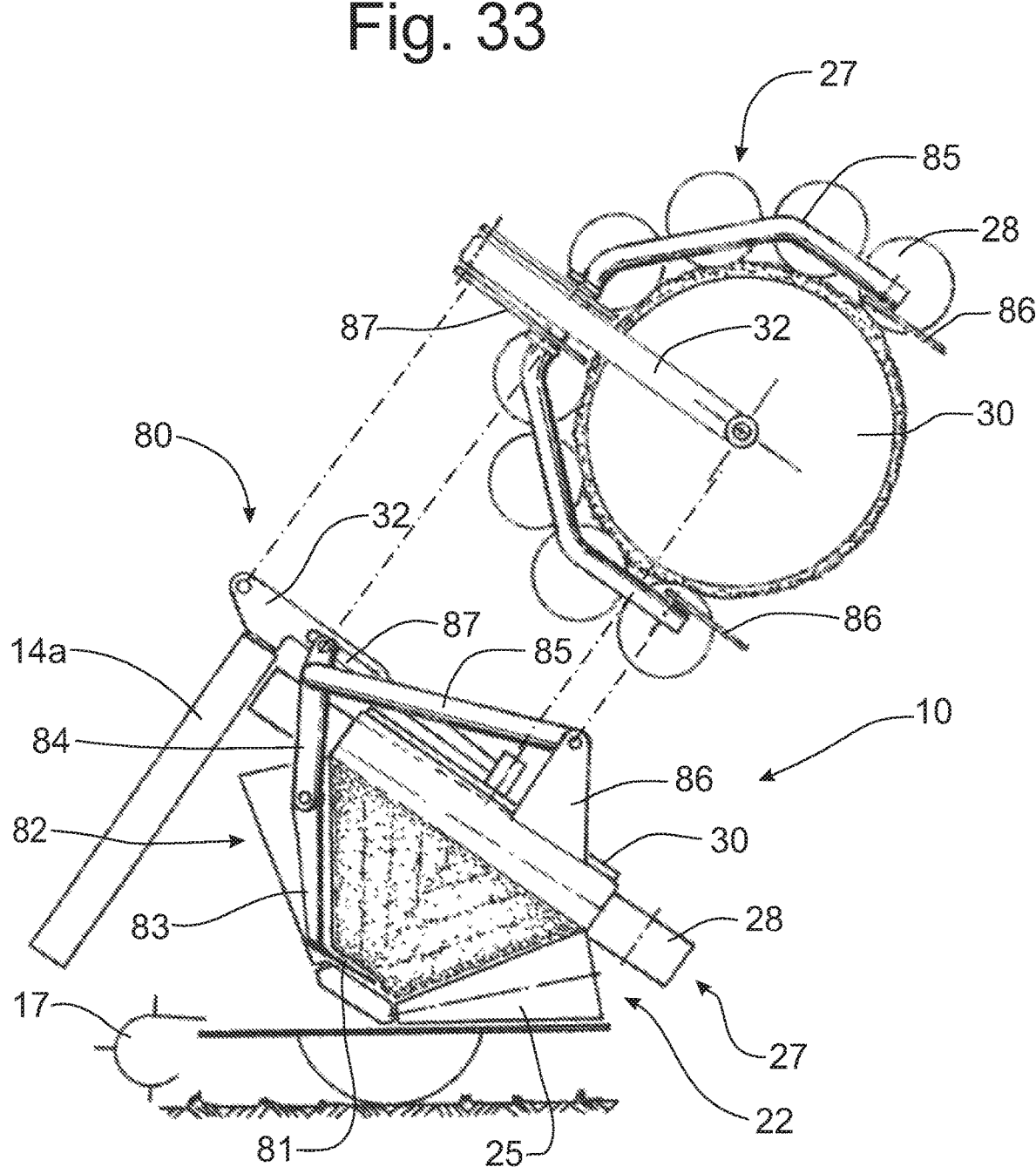
FIG. 31A is a partial schematic side elevational view of the continuous round baler as shown in FIG. 31 but used in conjunction with FIG. 33 to depict with dashed lines the corresponding location of pivots.
FIG. 33 is a top plan view of the continuous round baler shown in FIG. 31 with some of the conical and cylindrical rolls being removed for purposes of clarity.

The engagement of the tail end knot 64 with the interlock loop 66 of roll 2 pulls the head end 65 of the roll 2 netting material upwardly. Since the knot 67 cannot pass through the U-shaped knot retainer 78 on the loop holder 76 for roll 1, the knot 67 causes the loop holder 76 to pivot on the support bar 77 until the U-shaped knot retainer 78 is oriented substantially vertically, as is depicted in FIG. 28, so that the knot 67 can move upwardly into the net receiver 68. One skilled in the art will recognize that the loop holder 76 may need to be spring-biased to the engagement position, with the spring (not shown) going overcenter when the loop holder 76 is tipped upwardly. The supply of netting material will then come from roll 2 passing in front of the second guide bar 74 until the supply of netting material on roll 2 is exhausted and the engagement of the tail end knot 64 of roll 2 with the interlock loop of roll 3 switches the supply to roll 3 in the same manner as described above. Looking at FIG. 19, the arrangement of the first guide bar 72, loop holders 76 and the support bar 77 maintains the interlock loop 66 in position on the corresponding loop holder 76. With the supply of netting material passing behind the first guide bar 72 and through the interlock loop 66 for the subsequent roll, the U-shaped interlock loop 66 prevents the head end 65 of the netting material from slipping rearwardly from the interlock mechanism 70 and the netting material engaging the first guide bar 72 prevents the interlock loop 66 from slipping forwardly of the loop holder 76.

Referring now to FIGS. 31-39, a first alternative bale severance mechanism 80 can best be seen. The primary function of the first alternative bale severance mechanism 80 is to sever the crop material as the crop material enters the conical bale forming chamber 22 maintaining a parallel cut path to define a line of separation between the formed cylindrical bales. As is noted previously, the draft tongue 14 provides support for the telescopic extension of the support beam 32 for the rear support plate 30. More specifically, the draft tongue 14 includes a hitch member that extends generally horizontally, and a hollow frame member 14*a* that extends upwardly from the hitch member at an acute angle extending from a vertical orientation. This acute angle is preferably less than 60 degrees so that the protruded cylindrical bale is oriented at the same angle relative to vertical.

The first alternative bale severance mechanism 80 includes a knife member 81 supported on the distal end of an articulated mounting arm 82 that is affixed to a bifurcated support arm 85 that is pivotally connected to a mounting bracket 86 supported on the roller support member 15, and is pivotally connected to a slotted mounting bracket 87 formed as part of the support beam 32 extending telescopically from the frame member 14*a*. One skilled in the art will note that many of the components of the round baler 10 have been broken away for the purpose of clarity in the viewing of this first alternative bale severance mechanism 80. The articulated mounting arm 82 is formed with a knife holder 83 that is pivotally connected to an upper mounting arm 84 that is pivotally received in the slotted mounting bracket 87. The knife member 81 is fixed to the knife holder 83 in a manner such that the knife member 81 is oriented perpendicularly to the angle of the hollow frame member 14*a* so that the cuts made to the crop material by the knife member 81 are perpendicular to the cylindrical axis of the bale being formed. The knife holder 83 is disposed relative to the knife member 81 at the angle of the conical bale forming chamber 22 such that the vertical movement of the mounting arm 82 keeps the knife holder 83 parallel to the side of the conical bale chamber 22.

Movement of the mounting arm 82 is accomplished by the movement of the protruding cylindrical bale, or alternatively can be powered to correspond to the protrusion of the cylindrical bale, in conjunction with the engagement of the rear support plate 30 mounted on the distal end of the support beam 32. Accordingly, the rear support plate 30 moves with the protruding cylindrical bale to maintain support of the upper end thereof. As the support beam 32 extends telescopically from the hollow frame member 14*a*, the slotted mounting bracket 87 moves upwardly with the support beam 32 and pulls the upper mounting arm 84 with the support beam 32. The fixed connection between the upper mounting arm 84 and the bifurcated support arm moves the pivotal connection between the upper mounting arm 84 and the knife holder 83 upwardly and outwardly from the cylindrical bale, as can be seen in comparisons between FIGS. 34-37.

Figure 34:
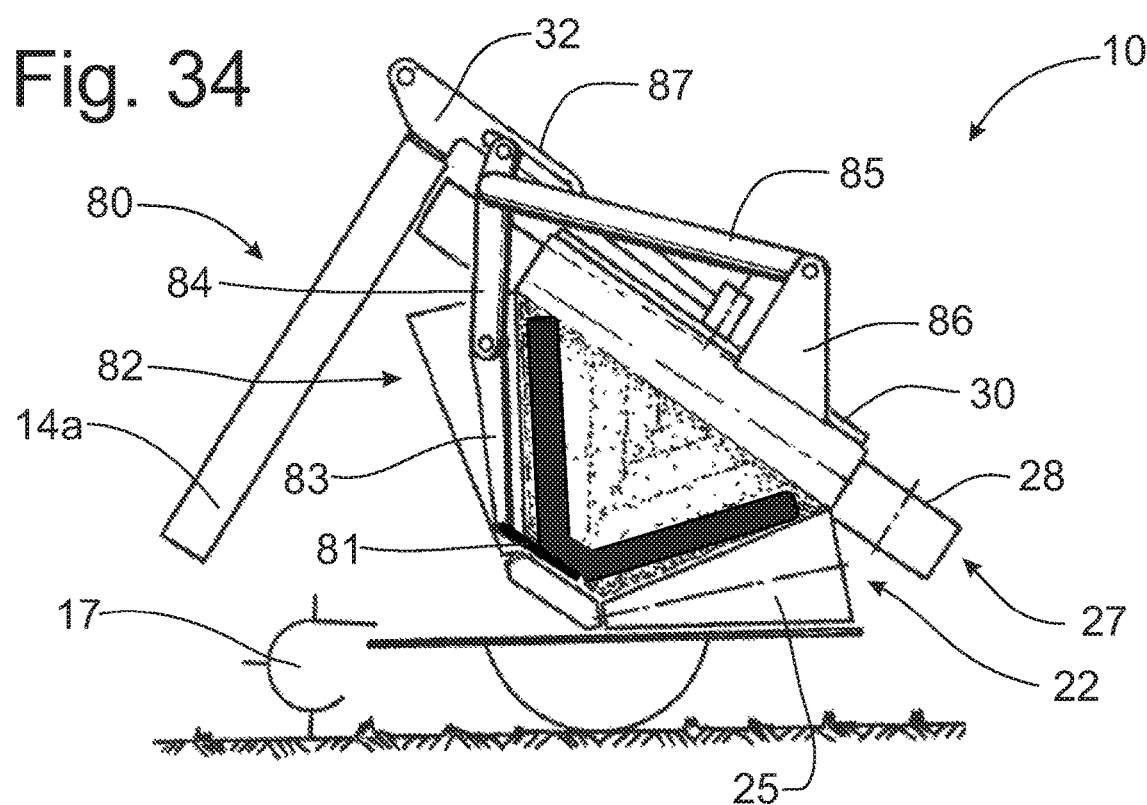
FIG. 34 is a partial side elevational view of the continuous round baler as shown in FIG. 31 showing the operation of the bale slicing mechanism beginning at the initial position, the initial conical wedge of crop material at the beginning of the operation of the bale slicing mechanism being highlighted.

As a result, the knife member 81 rises with the protruding cylindrical bale to maintain a cutting operation on the incoming crop material in a parallel manner to define a separation between formed cylindrical bales. The knife member 81 has a length that is as long as the depth of the incoming swath of crop material inserted into the conical bale chamber 22 so that the knife member 81 will cut the incoming crop material as the crop material is inputted into the conical bale chamber 22 and the bale is protruded upwardly. The progression of the inputted crop material relative to the knife member 81 is seen in FIGS. 34-37. In FIG. 34 the knife member 81 is inserted into the conical bale chamber 22 between a pair of selected adjacent conical rollers 25, as well as between the corresponding circular rollers 28. The outermost layer of incoming crop material is highlighted in FIG. 34.

Figure 35:
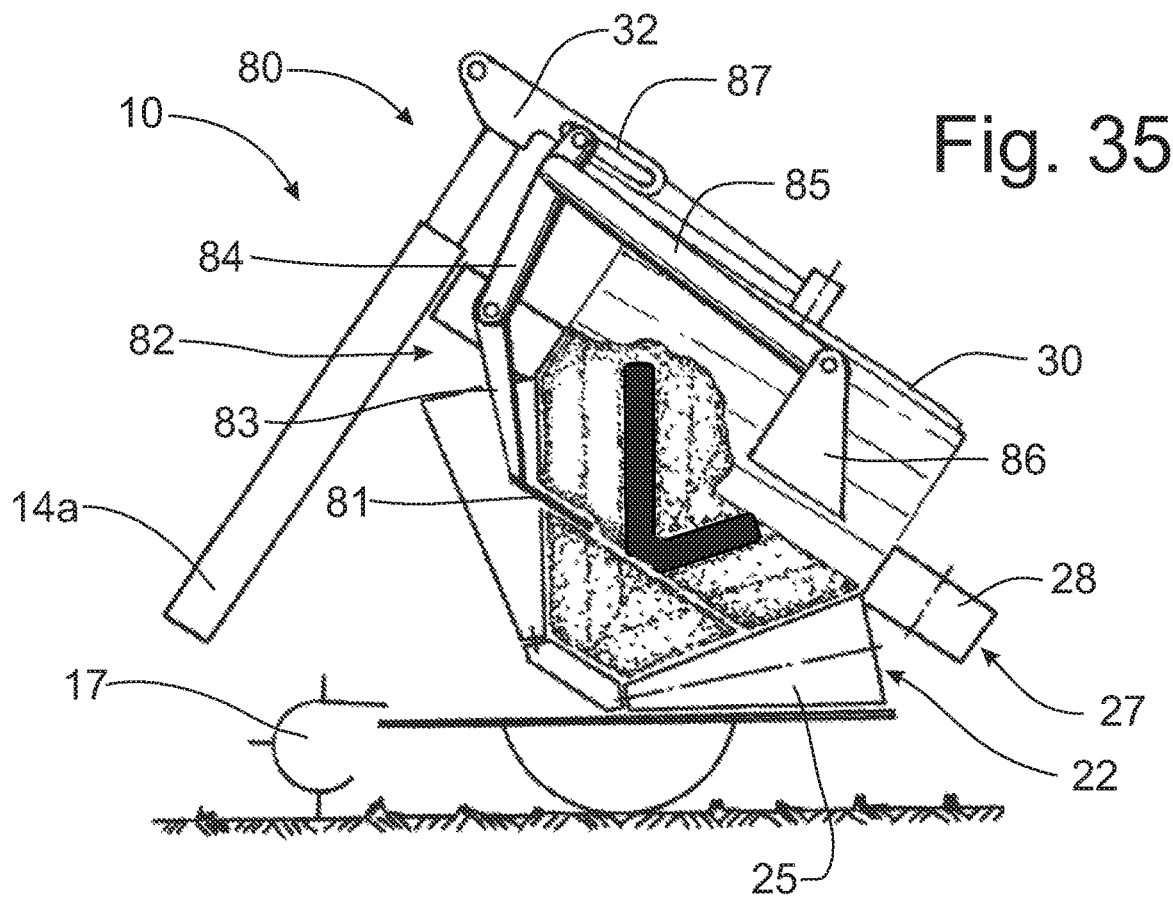
FIG. 35 is a partial side elevational view of the continuous round baler with the bale slicing mechanism progressed through approximately half of the length of the bale, the initial conical wedge of crop material being highlighted.
Figure 36:
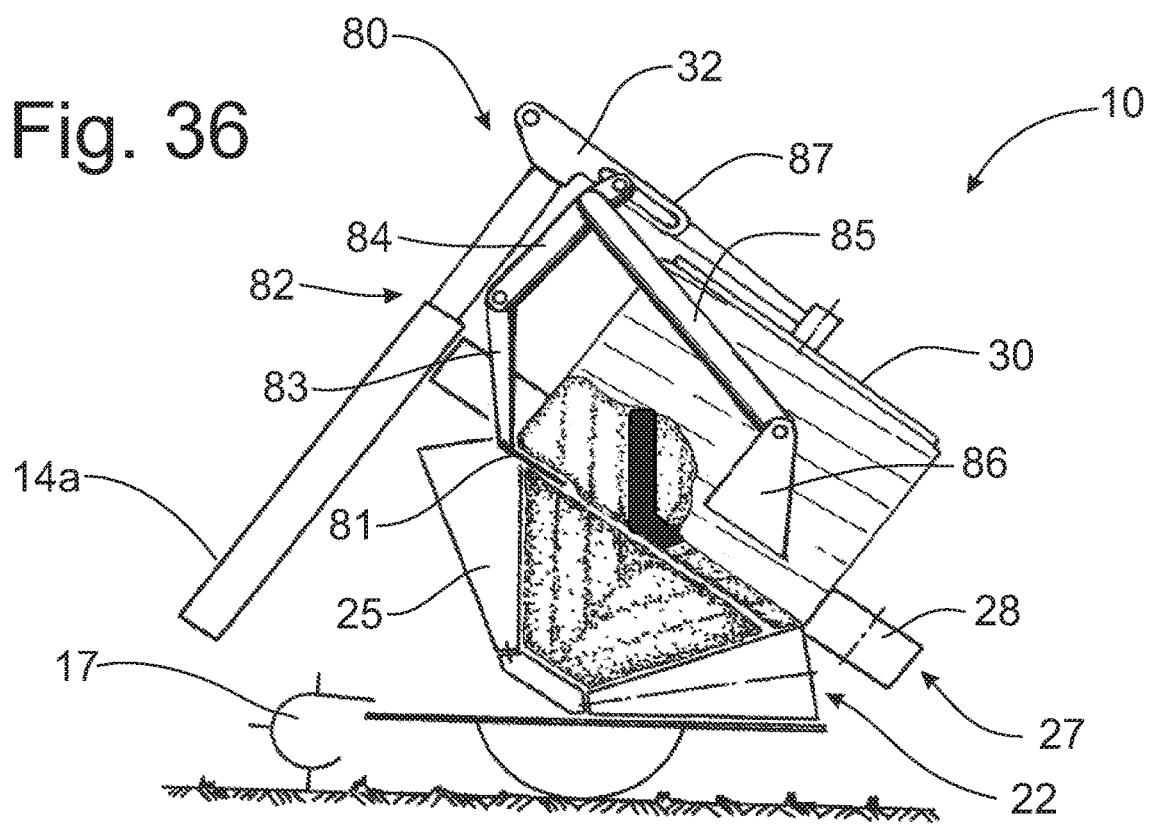
FIG. 36 is a partial side elevational view of the continuous round baler with the bale slicing mechanism progressed to the end of the bale slicing operation, the location of the blade being at the bottom of the array of cylindrical rollers, the initial conical wedge of crop material being highlighted.

The progression of the cylindrical bale is depicted in FIG. 35 such that the crop material in the conical bale chamber 22 has made approximately two revolutions, adding two layers of crop material outside of the highlighted layer. The knife member 81 remains located between the selected conical rollers 25, but rises with the protrusion of the cylindrical bale as a result of the telescopic extension of the support beam 32 from the hollow frame member 14*a*. In FIG. 36, additional layers of crop material have been inputted into the conical bale chamber 22 causing the cylindrical bale to protrude further and moving the knife member 81 vertically within the conical bale chamber 22. The original highlighted layer is now positioned at the center of the formed cylindrical bale that is about to be discharged from the baler 10.

Figure 37:
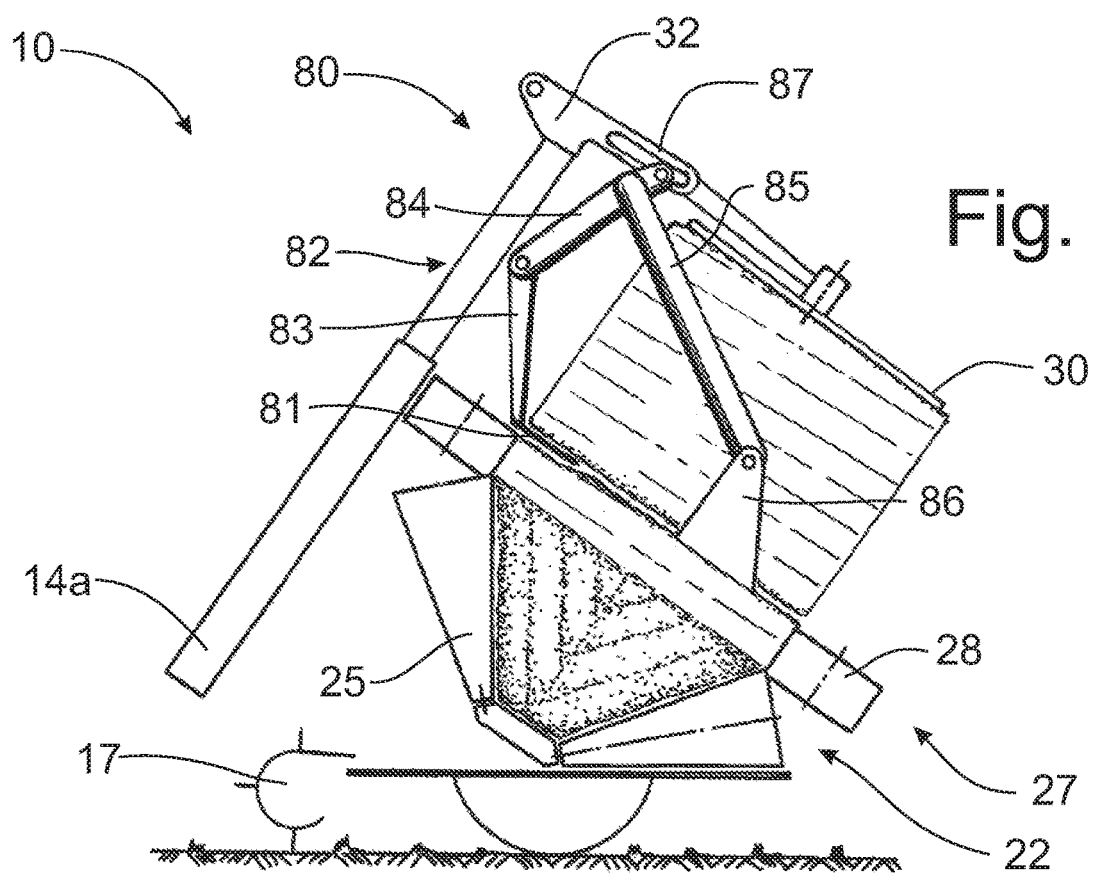
FIG. 37 is a partial side elevational view of the continuous round baler with the bale slicing mechanism following the formation of the cylindrical bale with the blade being above the array of cylindrical rollers.
Figure 38:
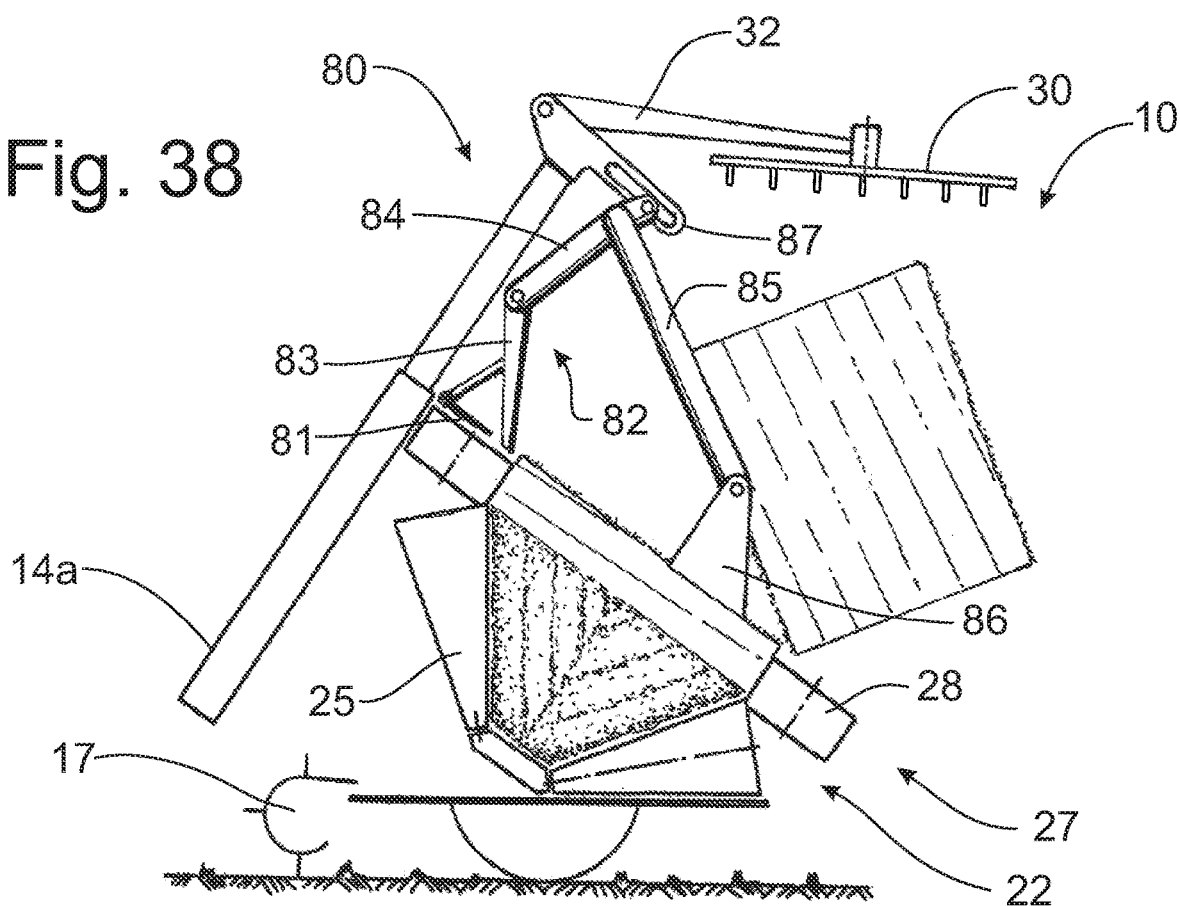
FIG. 38 is a partial side elevational view of the continuous round baler with the severed cylindrical bale being discharged from the baler onto the ground, the bale slicing mechanism being withdrawn for repositioning.
Figure 39:
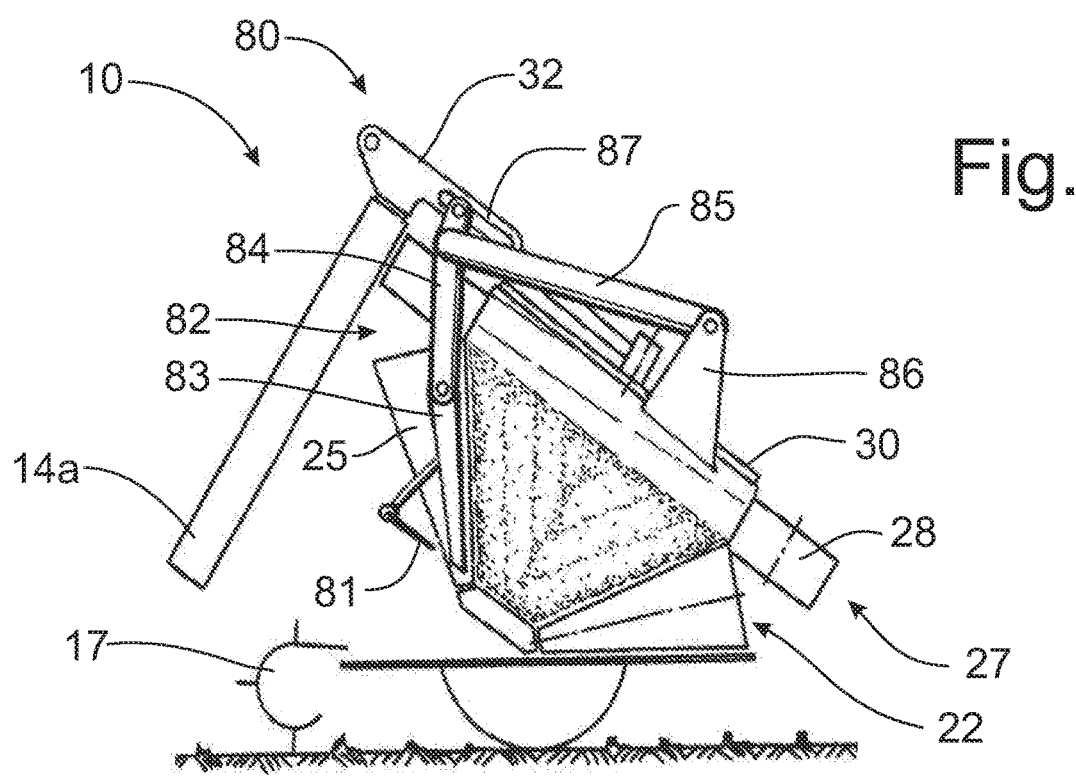
FIG. 39 is a side elevational view of the continuous round baler with the bale slicing mechanism being re-positioned to insert the blade at the bottom of the conical bale forming chamber to start severance of another cylindrical bale at the formation thereof.

In FIG. 37, the formed cylindrical bale has moved to the top of the array of cylindrical rollers 28 and the knife member has passed between the selected cylindrical rollers 28 and is located at the top of the array. The formed cylindrical bale is discharged from the baler 10 in FIG. 38 as the rear support plate 30 is disengaged, allowing the bale to fall to the ground. In FIG. 39, the support beam 32 is retracted into the hollow frame member 14*a*, the rear support plate 30 is re-engaged with the top surface of the newly forming cylindrical bale, and the knife member 81 is re-positioned for insertion into the conical bale chamber 22 to start the bale severance process anew.

Figures 40, 41:
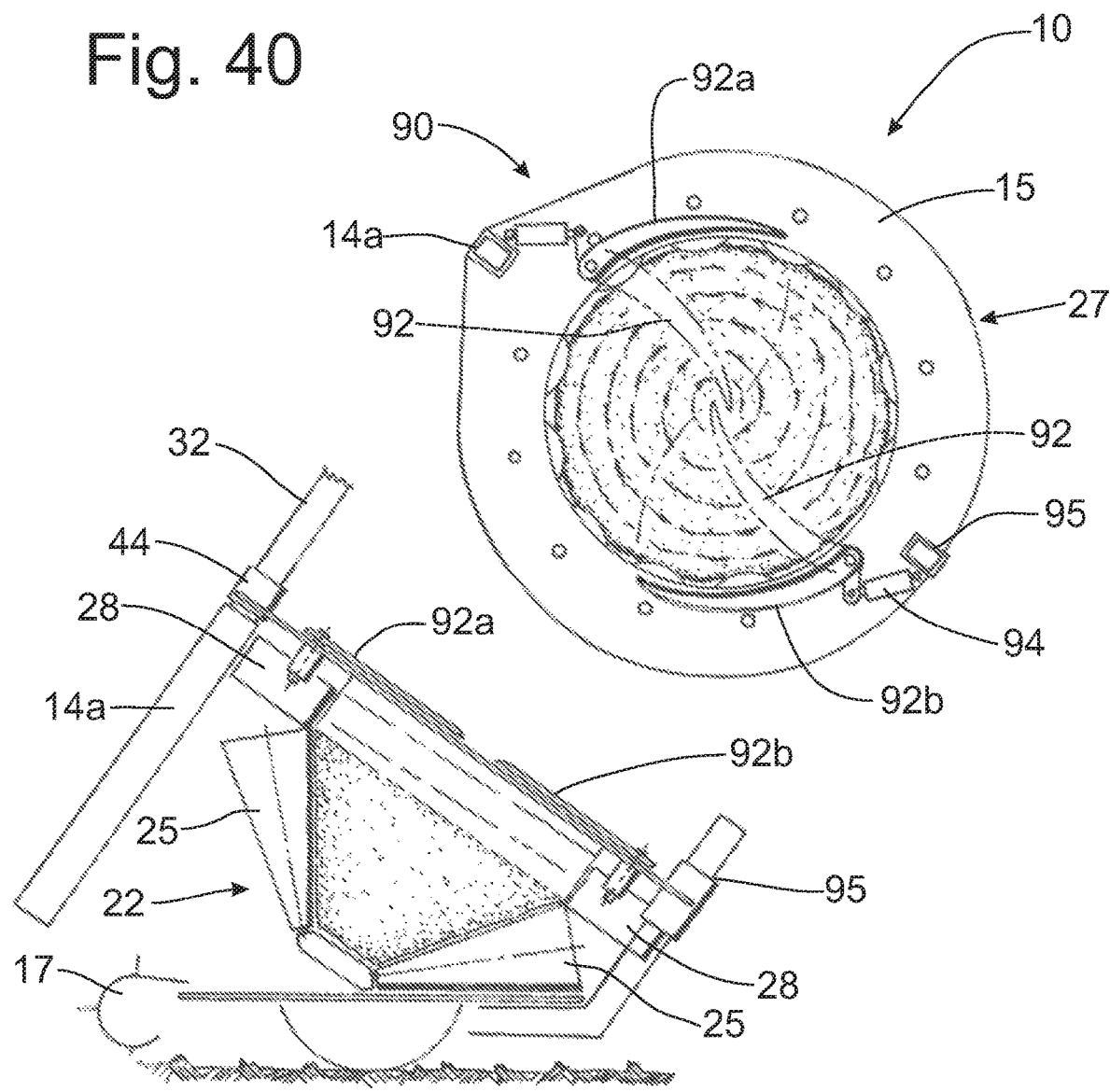
FIG. 40 is a partial top plan view of the continuous round baler with a second alternative bale severance mechanism depicted, the movement of the bale slicing knives being shown in phantom.
FIG. 41 is partial side elevational view of the continuous round baler shown in FIG. 40.

A second alternative bale severance mechanism 90 is depicted in FIGS. 40 and 41 and is similar to the bale severance device 40 described above. The second alternative bale severance device 90 utilizes a pair of cutting blades 92 mounted on the circular roller support member 15 on opposite sides of the protruding cylindrical bale. At the desired moment of actuation to separate a desired length of cylindrical bale for discharge, the hydraulic cylinders 94 operatively coupled to the blades 92 swing the blades 92 into engagement with the cylindrical bale. As with the bale severance device 40, the blades 92 and hydraulic cylinders 94 are movable with the protrusion of the cylindrical bale. The cutting blade 92*a* adjacent the hollow frame member 14*a* is coupled to the support beam to move upwardly with the support beam 32. However, to permit a corresponding movement for the other cutting blade 92*b*, a secondary support 95 would be required to enable the upward movement of the cutting blade 92*b* and the associated hydraulic cylinder 94.

The second alternative bale severance mechanism 90 has the advantage of simplicity, as well as speed of operation. With two cutting blades 92 operating to sever the protruded cylindrical bale, the separation process can be accomplished quickly. Furthermore, compared to the long knife 42 of the bale severance device 40, neither of the cutting blades 92 is positioned outside of the confines of the circular roller support member 15 during operation or during storage waiting to be activated. Some control of the discharge movement of the separated cylindrical bale would need to be provided to protect the secondary support 95, the cutting blade 92*b* and the corresponding hydraulic cylinder 94.

Figure 42:
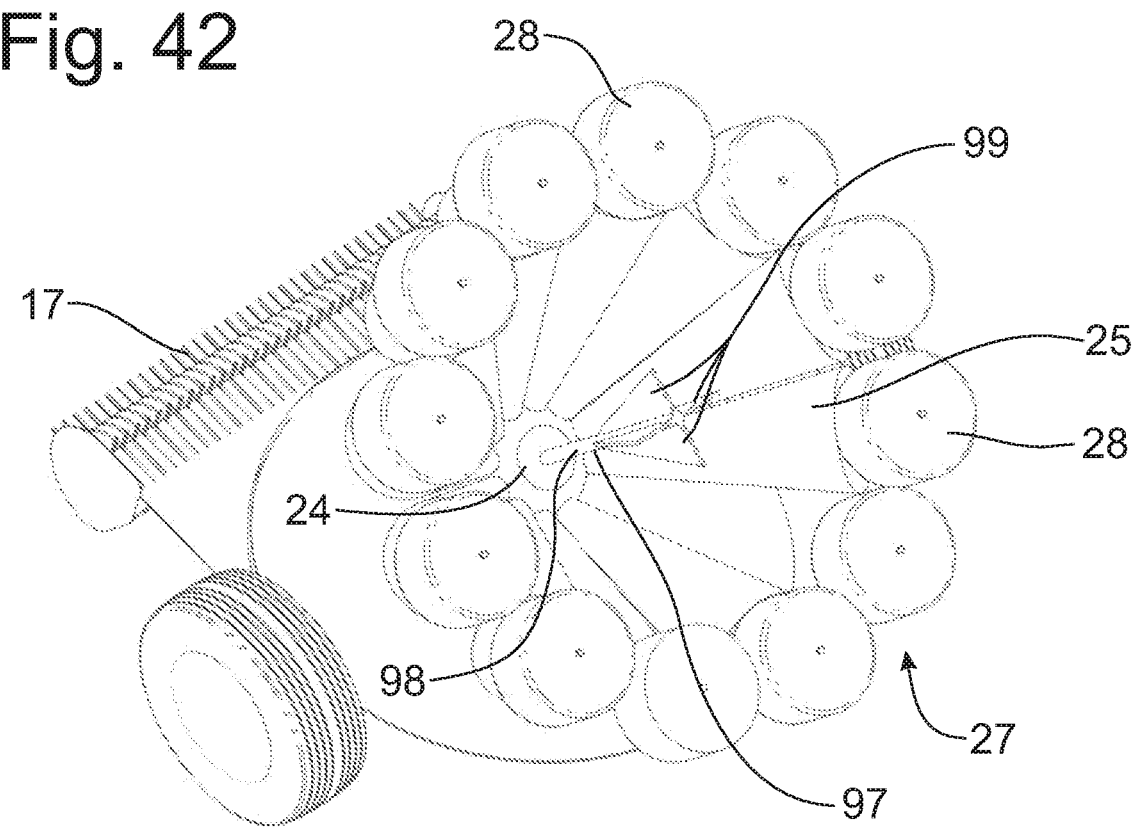
FIG. 42 is a schematic perspective view of the continuous round baler having a bale density spear mounted in the center of the conical bale formation chamber.
Figure 43:
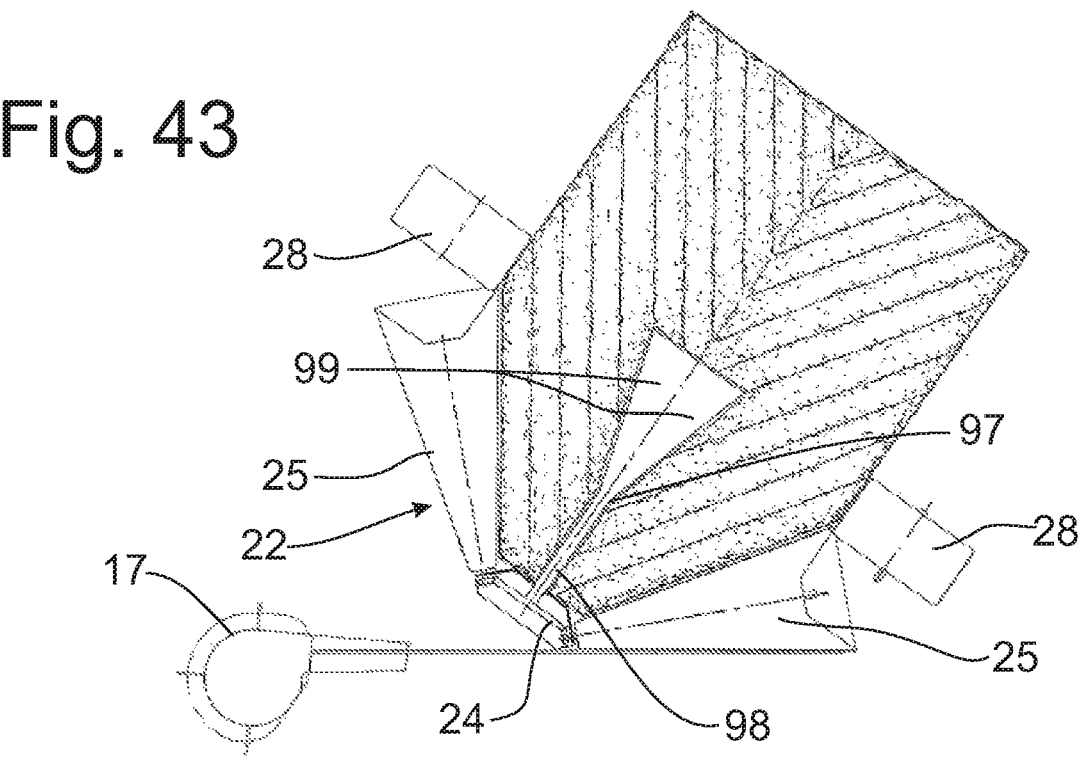
FIG. 43 is a schematic vertical cross sectional view through the center of the round baler showing the location of the bale density spear during the formation of the cylindrical bale.

A bale density spear 97 is depicted in FIGS. 42 and 43. The bale density spear 97 is detachably secured to a bottom plate 24 of the conical bale chamber 22 in a manner to be rotatable with the crop material within the conical bale chamber 22. The bale density spear 97 includes a slender lower shaft 98 that spreads into triangular fins 99. As the crop material enters into the conical bale chamber 22, the crop material entering the conical bale chamber 22 pushes the crop material already in the conical bale chamber upwardly toward the circular portion of the bale chamber 27. The fins 99 of the bale density spear 97 resist this upward movement of the forming bale and, therefore, increase the density of the bale being formed in the conical bale chamber 22. The bale density spear 97 can be freely rotatable to move with the forming bale. Alternatively, the bottom plate 24 can be rotatably driven independently, or in conjunction with the rotation of the conical rollers 25, thereby causing the bale density spear 97 to rotate. The powered version of the bale density spear 97 can also function to start the rotation of the crop material within the conical bale chamber 22, especially in conjunction with the initial bale being formed.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A continuous round baler movable in a forward direction of travel, comprising:
   a frame;
   a crop pick-up mechanism supported on the frame to collect crop material;
   a crop transfer table positioned to receive crop material collected by said pick-up mechanism and to deliver said collected crop material to one side of said crop transfer table;
   a bale chamber oriented longitudinally with respect to said direction of travel and having a lower, forward conical portion and a contiguous upper, rearward cylindrical portion, said crop transfer table feeding collected crop material into said conical portion to form a conically shaped mass of crop material having a maximum diameter equal to the diameter of the cylindrical portion, said bale chamber being rotatable to form a cylindrical bale from a continued feeding of crop material into said conical portion and protruding said cylindrical bale of crop material from an upper terminal end of said cylindrical portion; and
   a bale severance mechanism supported on said frame to sever a round bale having a predetermined length from said cylindrical bale of crop material protruding from said cylindrical portion, said bale severance mechanism engaging said cylindrical bale above said upper terminal end of said cylindrical portion where said cylindrical bale is protruding from said cylindrical portion.

2. The continuous round baler of claim 1 further comprising:
   a rear support member engagable with a distal end of said cylindrical bale of crop material for support thereof as said cylindrical bale of crop material protrudes from said cylindrical portion, said bale severance mechanism being cooperable with said rear support member to sever said round bale from said cylindrical bale.

3. The continuous round baler of claim 2 wherein said rear support member includes a plate engaged with the distal end of said cylindrical bale, said plate being rotatable with said cylindrical bale.

4. The continuous round baler of claim 3 wherein said plate is mounted on a support beam telescopingly received within said frame, said support beam extending from said frame as said cylindrical bale protrudes from said cylindrical portion of said bale chamber, said support beam retracting into said frame after said round bale is severed from said cylindrical bale by said bale severance mechanism to reengage said plate with the distal end of said protruding cylindrical bale of crop material.

5. The continuous round baler of claim 1 wherein said conical portion of said bale chamber is formed by a plurality of rollers arranged in a conical configuration and terminating at said cylindrical portion of said bale chamber, said continuous round baler further comprising a drive mechanism rotatably driving at least one of said rollers of said conical portion of said bale chamber.

6. The continuous round baler of claim 5 wherein said crop transfer table is rotatably mounted to move crop material collected by said pick-up mechanism into said conical portion of said bale chamber, said continuous round baler further comprising a metering sensor configured to determine the volume of crop material present on said rotatable crop transfer table, said metering sensor being operably coupled to said drive mechanism to interrupt said drive mechanism when an insufficient volume of crop material is present to feed into said conical portion of said bale chamber.

7. The continuous round baler of claim 1 further comprising a net wrapping mechanism supported on said frame to wrap a netting material around said cylindrical bale while within said cylindrical portion of said bale chamber, said net wrapping mechanism being operable continuously while said drive mechanism is rotating said cylindrical bale.

8. The continuous round baler of claim 7 wherein said net wrapping mechanism utilizes a plurality of rolls of netting material connected together to provide a supply of netting material to said cylindrical portion of said bale chamber.

9. The continuous round baler of claim 5 wherein said conical portion of said bale chamber has a length dimension extending in an axial direction that is greater than a corresponding length dimension of said cylindrical portion of said bale chamber.

10. The continuous round baler of claim 9 wherein said cylindrical portion of said bale chamber is formed by a plurality of cylindrical rollers, whereby each cylindrical roller is aligned with a corresponding roller of said conical portion of said bale chamber.

11. The continuous round baler of claim 10 wherein said rollers forming said conical portion of said bale chamber are frusto-conical in shape.

12. The continuous round baler of claim 11 wherein each said cylindrical roller is operatively coupled to the corresponding frusto-conical roller to rotate therewith.

13. The continuous round baler of claim 5 wherein said bale severance mechanism includes a knife mounted for movement into said crop material, said knife being coupled to a rear support beam telescopingly received within said frame to move upwardly with said rear support beam as the crop material moves upwardly to continue to sever crop material along a plane to form a separation between said cylindrical bale and said round bale having said predetermined length.

14. The continuous round baler of claim 1 wherein the crop transfer table is rotatably mounted.

15. A continuous round baler movable in a forward direction of travel, comprising:
a frame oriented generally vertically at an angle greater than 30 degrees relative to the ground;
a crop collection mechanism supported on said frame to gather crop material from the ground;
a bale chamber supported on said frame and defining a bale forming axis that is oriented longitudinally with respect to said forward direction of travel, said bale chamber including a lower, forward conical portion formed by a plurality of rollers that are arranged in a conical formation, said conical portion receiving crop material from said crop collection mechanism and being operable to protrude a cylindrical bale upwardly into an upper, rearward cylindrical portion of said bale chamber axially aligned with said conical portion and contiguous thereto, said bale chamber being oriented at an angle to both vertical and horizontal, positioning a discharge opening of said cylindrical portion-above at least a portion of said conical portion;
a drive mechanism to power the operation of said bale chamber and said crop collection mechanism such that the operation of said bale chamber is independent of said crop collection mechanism; and
a bale severance device operably supported on said frame for separating a formed round bale having a predetermined length from the cylindrical bale protruded from said cylindrical portion of said bale chamber.

16. The continuous round baler of claim 15 further comprising:
a rear support member mounted on a distal end of a support beam telescopingly received within said frame, said rear support member being engaged and rotatable with a distal end of said cylindrical bale of crop material for support thereof as said cylindrical bale of crop material protrudes from said cylindrical portion of said bale chamber, said support beam retracting into said frame after said round bale having a predetermined length is severed from said cylindrical bale by said bale severance mechanism to reengage said rear support member with the distal end of said protruding cylindrical bale of crop material.

17. The continuous round baler of claim 15 wherein said crop collection mechanism includes a crop pick-up mechanism operable to elevate crop material from the ground, and a rotatable transfer table positioned to received crop material from said pick-up mechanism and to move said crop material into said conical portion of said bale chamber, said crop collection mechanism further including a metering sensor configured to determine the volume of crop material present on said transfer rotatable table, said metering sensor being operably coupled to said drive mechanism to interrupt the rotation of said bale chamber when an insufficient volume of crop material is present on said rotatable transfer table to feed into said conical portion of said bale chamber.

18. The continuous round baler of claim 15 further comprising a net wrapping mechanism supported on said frame to wrap a netting material around said cylindrical bale while engaged by said cylindrical rollers of said bale chamber, said net wrapping mechanism being operable continuously while said drive mechanism is rotating said bale chamber.

19. A method of forming a round bale comprising the steps of:
providing a continuous round baler having a frame supporting a bale chamber having a conical portion and a contiguous cylindrical portion, said bale chamber being oriented at an angle to both vertical and horizontal, positioning a discharge opening of said cylindrical portion above said conical portion;
feeding crop material into said conical portion of said bale chamber;
rolling said crop material within said conical portion of said bale chamber during said feeding step to form a generally conically shaped mass of crop material having a maximum diameter adjacent said cylindrical portion of said bale chamber;
adding netting material to said cylindrical bale while engaged by said cylindrical portion of said bale chamber, said netting material being applied contemporaneously with the rotation of said cylindrical bale;
protruding a rotating cylindrical bale from said discharge opening as crop material continues to be fed into said conical bale chamber; and
severing a selected length of said round bale from said protruded cylindrical bale and discharging said severed round bale to the ground.

20. The method of claim 19 further comprising the steps of:
determining a minimum volume of crop material to be fed into said conical portion of said bale chamber and continuing to feed crop material into said conical portion of said bale chamber while the volume of crop material is greater than said minimum volume;
interrupting the rotation of said cylindrical bale when said determining step indicates a volume of crop material that is less than said minimum volume; and
accumulating crop material on a transfer table without feeding crop material into said conical portion of said bale chamber until the volume of accumulated crop material is greater than said minimum volume and then re-establishing the rotation of said cylindrical bale while said crop material is being fed into said conical portion.

21. The continuous round baler of claim 15 wherein both said conical portion and said cylindrical portion have a length dimension measured along said bale forming axis, said length dimension of said cylindrical portion being less than said length dimension of said conical portion.

22. The continuous round baler of claim 15 wherein said bale severance device engages said cylindrical bale above said cylindrical portion where said cylindrical bale is protruding from said cylindrical portion.

23. A continuous round baler movable in a forward direction of travel, comprising:
a frame;
a crop pick-up mechanism supported on the frame to collect crop material;
a crop transfer table positioned to receive crop material collected by said pick-up mechanism and to deliver collected crop material to one side of said crop transfer table;
a bale chamber oriented longitudinally with respect to said direction of travel and having a lower, forward conical portion and a contiguous upper, rearward cylindrical portion, said crop transfer table feeding collected crop material into said conical portion to form a conically shaped mass of crop material having a maximum diameter equal to the diameter of the cylindrical portion, said bale chamber being rotatable to form a cylindrical bale from a continued feeding of crop material into said conical portion and protruding said cylindrical bale of crop material from an upper terminal end of said cylindrical portion;

a bale severance mechanism supported on said frame to sever a round bale having a predetermined length from said cylindrical bale of crop material protruding from said cylindrical portion; and a rear support member engagable with a distal end of said cylindrical bale of crop material for support thereof as said cylindrical bale of crop material protrudes from said cylindrical portion, said bale severance mechanism being cooperable with said rear support member to sever said round bale from said cylindrical bale.

24. A method of forming a round bale comprising the steps of:

providing a continuous round baler having a frame supporting a bale chamber having a conical portion and a contiguous cylindrical portion, said bale chamber being oriented at an acute angle to vertical, positioning a discharge opening of said cylindrical portion generally vertically;

feeding crop material into said conical portion of said bale chamber;

rolling said crop material within said conical portion of said bale chamber during said feeding step to form a generally conically shaped mass of crop material having a maximum diameter adjacent said cylindrical portion of said bale chamber;

protruding a rotating cylindrical bale from said discharge opening as crop material continues to be fed into said conical bale chamber;

severing a selected length of said round bale from said protruded cylindrical bale and discharging said severed round bale to the ground;

determining a minimum volume of crop material to be fed into said conical portion of said bale chamber and continuing to feed crop material into said conical portion of said bale chamber while the volume of crop material is greater than said minimum volume;

interrupting the rotation of said cylindrical bale when said determining step indicates a volume of crop material that is less than said minimum volume; and accumulating crop material on a transfer table without feeding crop material into said conical portion of said bale chamber until the volume of accumulated crop material is greater than said minimum volume and then re-establishing the rotation of said cylindrical bale while said crop material is being fed into said conical portion.

* * * * *